US012227971B2

(12) United States Patent
Ray et al.

(10) Patent No.: US 12,227,971 B2
(45) Date of Patent: Feb. 18, 2025

(54) ANTI-THEFT CONNECTOR FOR EQUIPMENT

(71) Applicant: Lupex Japan Inc., Kanagawa (JP)

(72) Inventors: Liu Ray, New Taipei (TW); Ishii Yasuyuki, Kanagawa (JP); Umezawa Tsukasa, Kanagawa (JP)

(73) Assignee: LUPEX JAPAN INC., Kanagawa (JP)

( * ) Notice: Subject to any disclaimer, the term of this patent is extended or adjusted under 35 U.S.C. 154(b) by 247 days.

(21) Appl. No.: 17/795,679

(22) PCT Filed: Jan. 20, 2021

(86) PCT No.: PCT/JP2021/001818
§ 371 (c)(1),
(2) Date: Jul. 27, 2022

(87) PCT Pub. No.: WO2021/157355
PCT Pub. Date: Aug. 12, 2021

(65) Prior Publication Data

US 2023/0062089 A1 Mar. 2, 2023

(30) Foreign Application Priority Data

Feb. 5, 2020 (JP) ................................ 2020-017651

(51) Int. Cl.
*E05B 73/00* (2006.01)
*E05B 63/00* (2006.01)

(52) U.S. Cl.
CPC ...... *E05B 73/0082* (2013.01); *E05B 63/0056* (2013.01); *E05B 73/0005* (2013.01)

(58) Field of Classification Search
CPC ............ E05B 73/0005; E05B 73/0082; E05B 63/0056; E05B 63/06; E05B 65/0858
See application file for complete search history.

(56) References Cited

U.S. PATENT DOCUMENTS 505,299 A * 9/1893 Schneider ............... E05B 17/16 70/428
7,308,809 B2 12/2007 Lu
(Continued)

FOREIGN PATENT DOCUMENTS

CN 202509904 U 10/2012
CN 108699866 A 10/2018
(Continued)

OTHER PUBLICATIONS

Taiwan Intellectual Property Office, "Office Action", for corresponding Taiwan patent application No. 109106281, dated Nov. 17, 2023, 25 pp. includes English language translation.
(Continued)

*Primary Examiner* — Christine M Mills
*Assistant Examiner* — Peter H Watson
(74) *Attorney, Agent, or Firm* — Eckert Seamans Cherin & Mellott, LLC

(57) ABSTRACT

The present invention is to provide an anti-theft connector for equipment that can be used for different sized security slots with a single device, wherein the anti-theft connector is to be fixed to security slots of equipment, and comprises insertion pieces 20, 20 that have insertion pawls 21, 21 protruding and engageable with the security slots and base portions 22, 22, an angle adjusting means 30 adapted to enter between the base portions and to adjust the relative opening angles of the insertion pieces at least by a first opening angle and a second opening angle, and a locking means 40 for holding and locking the angle adjusting means.

8 Claims, 22 Drawing Sheets

(56) References Cited

U.S. PATENT DOCUMENTS

| | | | | |
|---|---|---|---|---|
| 7,353,672 | B2 * | 4/2008 | Lu | E05B 73/0005 70/57 |
| 8,844,329 | B2 | 9/2014 | Anderson | |
| 2008/0034816 | A1 | 2/2008 | Lu | |
| 2014/0026625 | A1 | 1/2014 | Wu et al. | |
| 2017/0247916 | A1 * | 8/2017 | Kao | G06F 1/1616 |
| 2018/0363334 | A1 | 12/2018 | Wu | |
| 2019/0112840 | A1 | 4/2019 | Wu | |
| 2020/0080346 | A1 | 3/2020 | Wu | |

FOREIGN PATENT DOCUMENTS

| | | | |
|---|---|---|---|
| CN | 209670582 | U | 11/2019 |
| CN | 209799646 | U | 12/2019 |
| DE | 20 2019 104 984 | U1 | 1/2020 |
| DE | 20 2020 100646 | U1 | 4/2020 |
| EP | 1 811 109 | A2 | 7/2007 |
| JP | HEI 11-013327 | A | 11/1999 |
| JP | 3559501 | B2 | 5/2004 |
| JP | 3216399 | U | 5/2018 |
| JP | 3220111 | U | 1/2019 |
| JP | 2019-105109 | A | 6/2019 |
| TW | M553352 | U | 12/2017 |
| TW | M564073 | U | 7/2018 |
| TW | M 583 478 | U | 9/2019 |

OTHER PUBLICATIONS

Japan Patent Office "International Search Report" for corresponding International Application No. PCT/JP2021/001818, mailed Mar. 2, 2021, 4 pp.

China National Intellectual Property Administration, "Office Action", for corresponding CN patent application No. 2021800131 70 .1, dated Feb. 10, 2023, 6 pp.

European Patent Office "extended European search report" for corresponding European patent application No. 21 750 266.5, dated Feb. 13, 2024, 7 pp.

European Patent Office "Communication pursuant to Rule 114(2) EPC observations filed by a Third Party" for corresponding European patent application No. 21 750 266.5, dated Aug. 17, 2022, 5 pp.

* cited by examiner

ANTI-THEFT CONNECTOR FOR EQUIPMENT

TECHNICAL FIELD

This invention relates to an anti-theft connector for equipment adapted to couple a security wire to a security slot formed in a device such as a laptop computer. More specifically, this invention relates to an anti-theft connector for equipment that allows compatibility with security slots with different widths of opening.

BACKGROUND ART

To protect compact devices such as laptop computers, displays, monitors, tablet terminals, cell phones, smart phones, etc. from theft, some devices have so-called security slots in the outer casing. The security slot is installed with an anti-theft connector to which a security wire is connected. Security wires are attached to desks, columns, display stands, etc. in such a way that they cannot be removed, thereby preventing these devices from being taken out or stolen.

For example, Patent Document 1 discloses an anti-theft connector to be attached to a security slot formed in a device. The anti-theft connector has a T-shaped retaining piece on its forward end and an anti-rotational piece slidable to the retaining piece. The retaining piece is inserted into the security slot and rotated by 90 degrees, and then the anti-rotational piece is inserted. Finally, a security wire is inserted therethrough to prevent them from moving relative to each other.

PRIOR ART DOCUMENT

Patent Document 1: Japanese Patent No. 3559501

SUMMARY OF INVENTION

Problems to be Solved by the Invention

In order to engage the anti-theft connector with the security slot without being disengaged, the retaining piece and the anti-rotation piece must match the size of the security slot. However, the sizes for the “width×height” of the security slot opening include a plurality of standards such as 4.5 mm by 3.2 mm, 6 mm by 2.5 mm, and 7 mm by 3 mm, and others. For this reason, a larger-sized anti-theft connector cannot be installed in a smaller-sized security slot. In addition, when a smaller-sized anti-theft connector is attached to a larger-sized security slot, there is problem that the anti-theft connector may be removed. This requires preparing multiple types of anti-theft connectors depending on the size of the security slot.

Therefore, there is a need for an anti-theft connector that can work with different sized security slots.

An object of the present invention is to provide an anti-theft connector for equipment that can be used for different sized security slots with a single device.

Means to Overcome the Problems

The present invention provides an anti-theft connector to be fixed to a security slot of equipment, the anti-theft connector comprising:

a housing formed on its forward end portion with an opening for protruding an insertion piece;

a first insertion piece having a first insertion pawls engageable with the security slot and protruding through the opening and a first base portion accommodated in the housing;

a second insertion piece having a second insertion pawls engageable with the security slot and protruding through the opening and a second base portion accommodated in the housing;

a support portion provided in the housing to pivotally support the first insertion piece and the second insertion piece between the forward end portion and the base end portion such that opening angle of the first insertion piece and the second insertion piece are variable;

an insertion piece biasing means for biasing the first insertion piece and the second insertion piece such that the opening angles between the first and second insertion pieces become smaller in the housing;

an angle adjusting means adapted to enter between the first and second base portions and to adjust the relative opening angles of the first and second insertion pieces at least by a first opening angle and a second opening angle; and a locking means for holding and locking the angle adjusting means in the state where the first insertion piece is adjusted to the first opening angle or the second insertion piece is adjusted to the second opening angle by the angle adjusting means.

The angle adjusting means is forced toward the base end side of the housing and comprises an angle adjustment piece formed at its forward end side and adapted to enter between the first base portion and the second base portion, and when the angle adjusting piece enters between the first base portion and the second base portion, the angle adjusting means is movable between a first position where the first insertion piece and the second insertion piece are in the first opening angle, a second position where the first insertion piece and the second insertion piece are in the second opening angle, and a third position where the angle adjustment piece does not enter between the first base portion and the second base portion.

The anti-theft connector comprises an adjuster member to move the angle adjusting means between the first and third positions and between the second and third positions.

The adjuster member is adapted to push the angle adjusting means from the third position into the first position or to push the angle adjusting means from the third position into the second position, when locked by the locking means.

The angle adjusting means has a concave portion and a convex portion on its base end. The adjuster member is adapted to push the angle adjusting means from the third position to the first position by contacting the convex portion, and to push the angle adjusting means from the third position to the second position by contacting the concave portion.

The angle adjusting means and the adjuster member are threaded to each other, and the length of the angle adjusting means and the adjuster member can be adjusted by rotating the adjuster member relative to the angle adjusting means.

The locking means comprises a locking pin disposed at the base end side of the housing and movable toward the base end side, and the locking means is locked by the movement of the locking pin toward the base end side of the housing, and when the locking pin is moved toward the base end side of the housing, a front tip of the locking pin pushes the angle adjusting means toward the base end side of the housing.

The anti-theft connector is preferably to provide a wire member connected to the housing.

Effect of the Invention

According to the present invention, the anti-theft connector for equipment can lock and hold the insertion piece at the opening angle by setting in advance to the size of the security slot. Therefore, the anti-theft connector can be engaged with the security slot and locked even if the size (opening width) of the security slot is different.

EMBODIMENT FOR CARRYING OUT THE INVENTION

<Basic Constitution>

Figure 1:
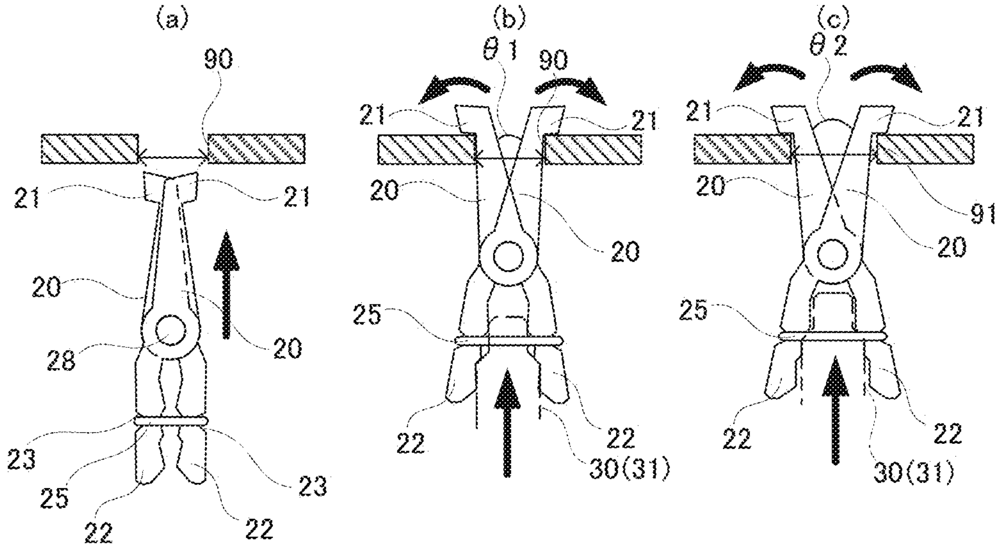
FIG. 1 is an illustration showing the operation of the insertion piece and angle adjusting means according to the present invention.

As shown in FIGS. 1(*a*) through 1(*c*), the anti-theft connector (security lock) 10 of the present invention has insertion pieces 20, 20 (a first insertion piece and a second insertion piece) equipped with insertion pawls 21, 21 that can be inserted in security slots 90 or 91 formed in a device such as a laptop computer and is engageable with the device. The insertion pieces 20, 20 are pivotally mounted on a pivot axis 28, and the insertion pawls 21, 21 (a first insertion pawl and a second insertion pawl) at the respective forward tips are bent in opposite directions. The opening angles of the insertion pieces 20, 20 are adjustable to fit the opening width of the security slot 90 or 91, and are locked and held at a predetermined opening angle.

The opening widths of security slots can be three types 4.5 mm, 6 mm, and 7 mm, as examples. In this regard, the opening widths of 6 mm and 7 mm can be shared by insertion pieces 20, 20 having the same opening angle. The first embodiment provides an anti-theft connector configured to perform a two-stage adjustment for the security slot 90 with an opening width of 4.5 mm (see FIG. 1(*b*) and the security slot with opening widths (6 mm and 7 mm) 91 (see FIG. 1(*c*)). The opening angles of the insertion pieces 20, 20 includes a first opening angle θ1 engageable with the security slot 90 (FIG. 1(*b*)) having an opening width of 4.5 mm, and a second opening angle θ2 engageable with the security slot 91 (FIG. 1(*c*)) having opening widths of 6.5 mm and 7 mm, wherein θ1 is smaller than θ2. Of course, it can also be configured to provide a three-stage adjustment as shown in other examples or to provide an adjustment for other opening widths different from those described above.

As shown in FIG. 1, the insertion pieces 20, 20 are provided at the base 22, 22 (one corresponds to the first base and the other to the second base) with an insertion piece biasing means 25, such as an annular rubber or spring to force the insertion pawls 21, 21 toward their closing direction. The opening angles of the insertion pieces 20, 20 is adjusted using an angle adjusting means 30, as shown in FIG. 1. The angle adjusting means 30 comprises a shaft-shaped angle adjustment piece 31 at the forward end. For example, the opening angle of the insertion pieces 20, 20 can be adjusted by adjusting the depth that the angle adjustment piece 31 enters between the bases 22, 22 of the insertion pieces 20, 20. In particular, when the angle adjustment piece 31 enters shallowly between the bases 22, 22, the insertion pieces 20, 20 have a first opening angle θ1, as shown in FIG. 1(*b*). When the angle adjustment piece 31 enters deeply between the bases 22, 22, the insertion pieces 20, 20 have a second opening angle θ2 larger than the first opening angle θ1, as shown in FIG. 1(*c*).

On the other hand, when the angle adjustment piece 31 of the angle adjusting means 30 is removed from the portion between the bases 22, 22 of the insertion pieces 20, 20, the insertion pawls 21, 21 are closed by the force from the insertion piece biasing means 25, as shown in FIG. 1(*a*), to become narrower than the opening width of the security slots 90 and 91, so that the insertion pieces 20, 20 can be inserted into and removed from the security slots 90 or 91.

The first to fourth embodiments will be described below with reference to the drawings. An explanation will be omitted for reference numbers, names, etc., that are used commonly in the above description and the following embodiments.

FIRST EMBODIMENT

Figure 2:
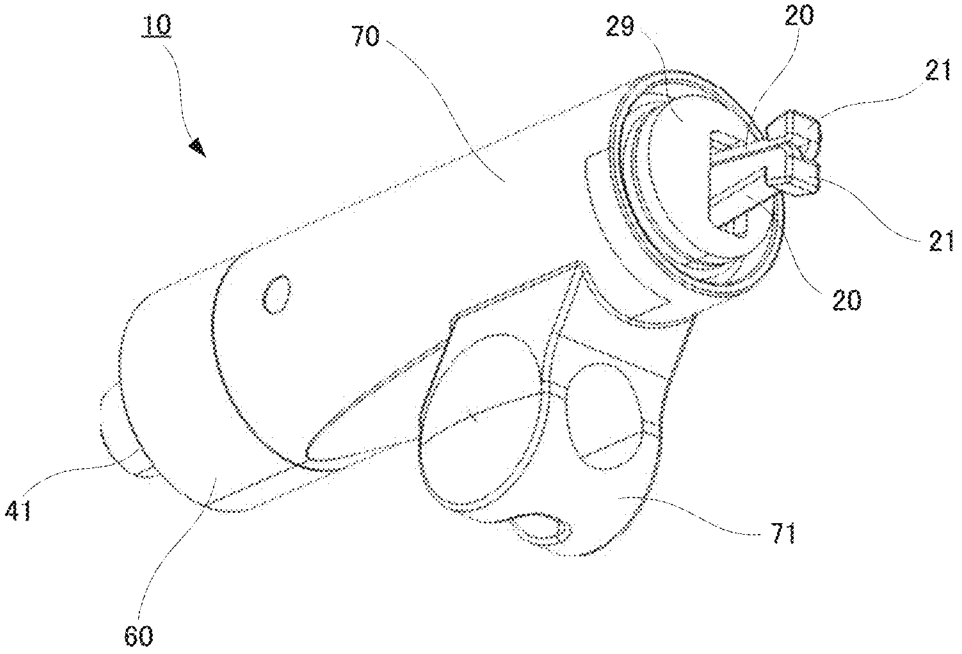
FIG. 2 is a perspective view of the anti-theft connector of the first embodiment viewed from the forward end side, and shows a state where the insertion piece is closed.
Figure 3:
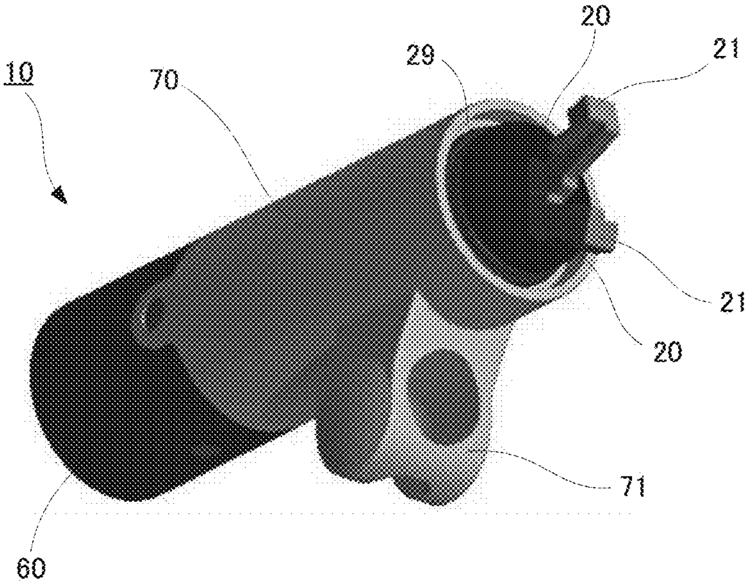
FIG. 3 is a perspective view of the anti-theft connector of the first embodiment viewed from the forward end side, and shows a state where the insertion piece is opened.
Figure 4:
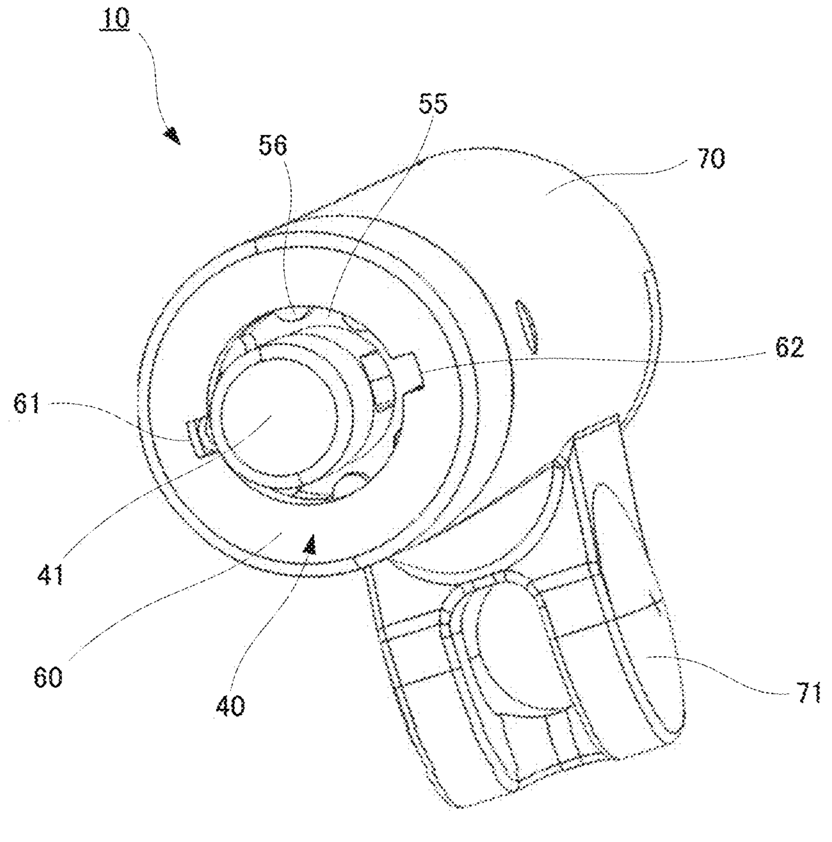
FIG. 4 is a perspective view of the anti-theft connector of the first embodiment viewed from the base end side.
Figure 5:
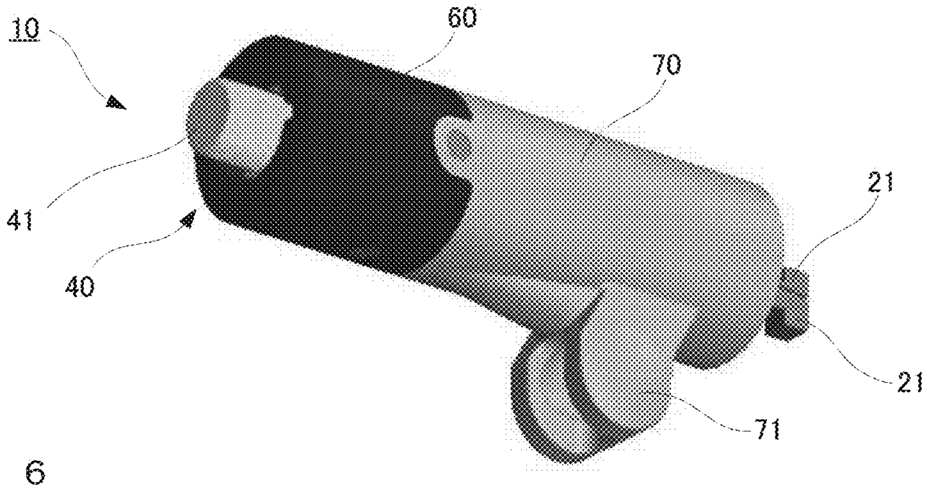
FIG. 5 is a perspective view of the anti-theft connector of the first embodiment and shows a state where a locking pin protruded.
Figure 6:
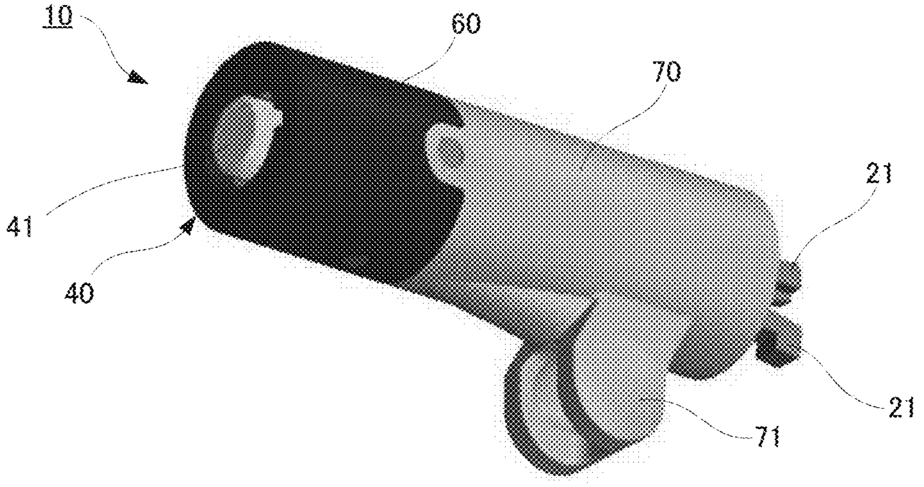
FIG. 6 is a perspective view of the anti-theft connector of the first embodiment and shows a state where a locking pin retracted.
Figure 7:
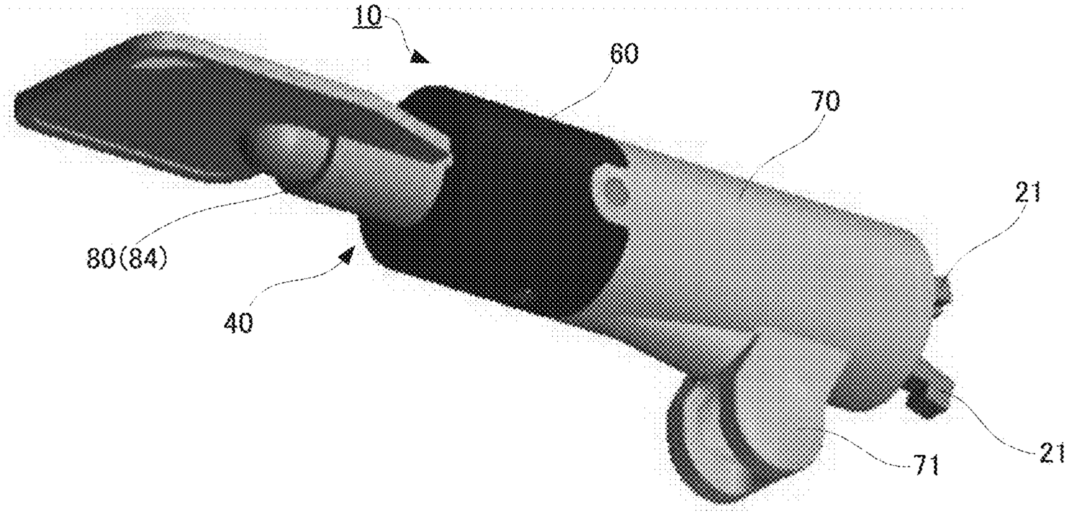
FIG. 7 is a perspective view of the anti-theft connector of the first embodiment and shows a state where a key is inserted.
Figure 8:
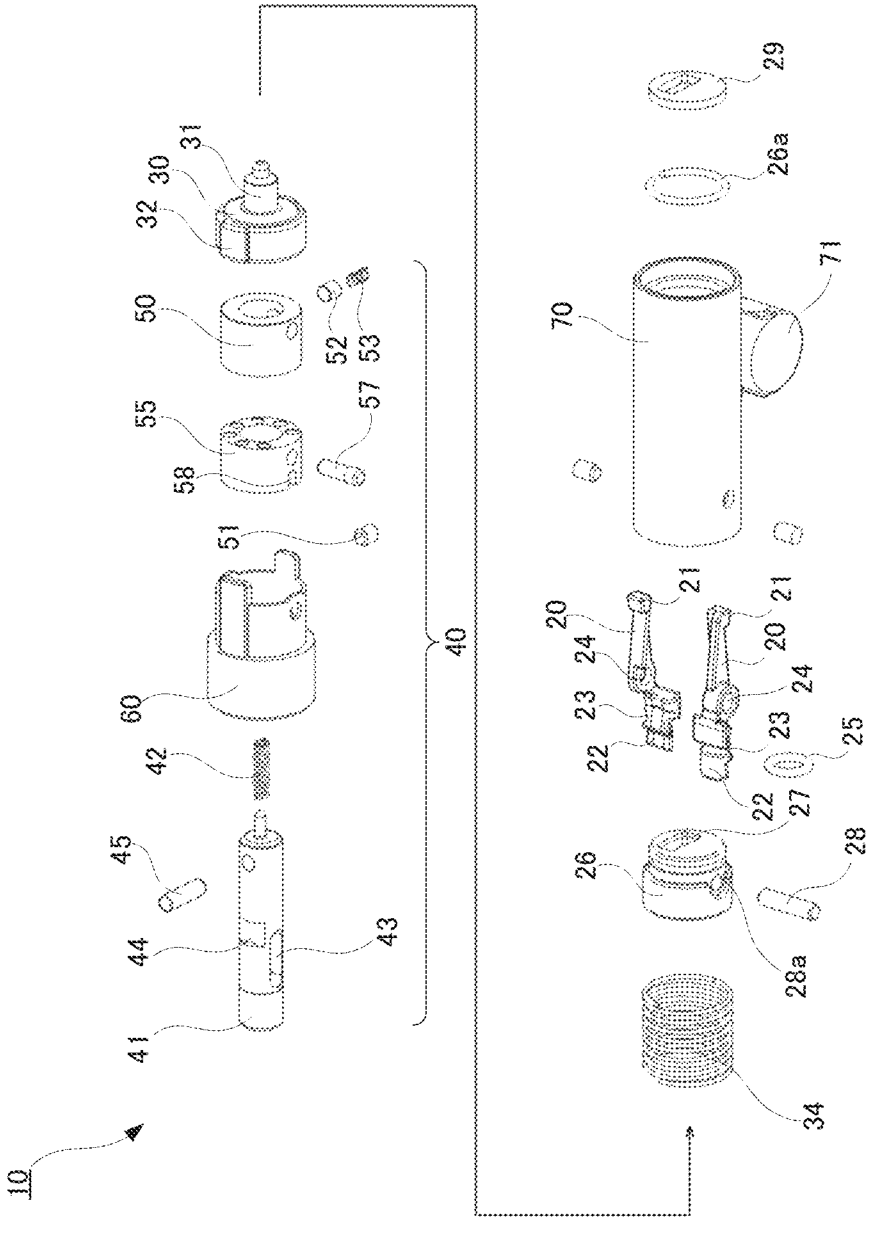
FIG. 8 is an exploded perspective view of the anti-theft connector of the first embodiment.
Figure 9:
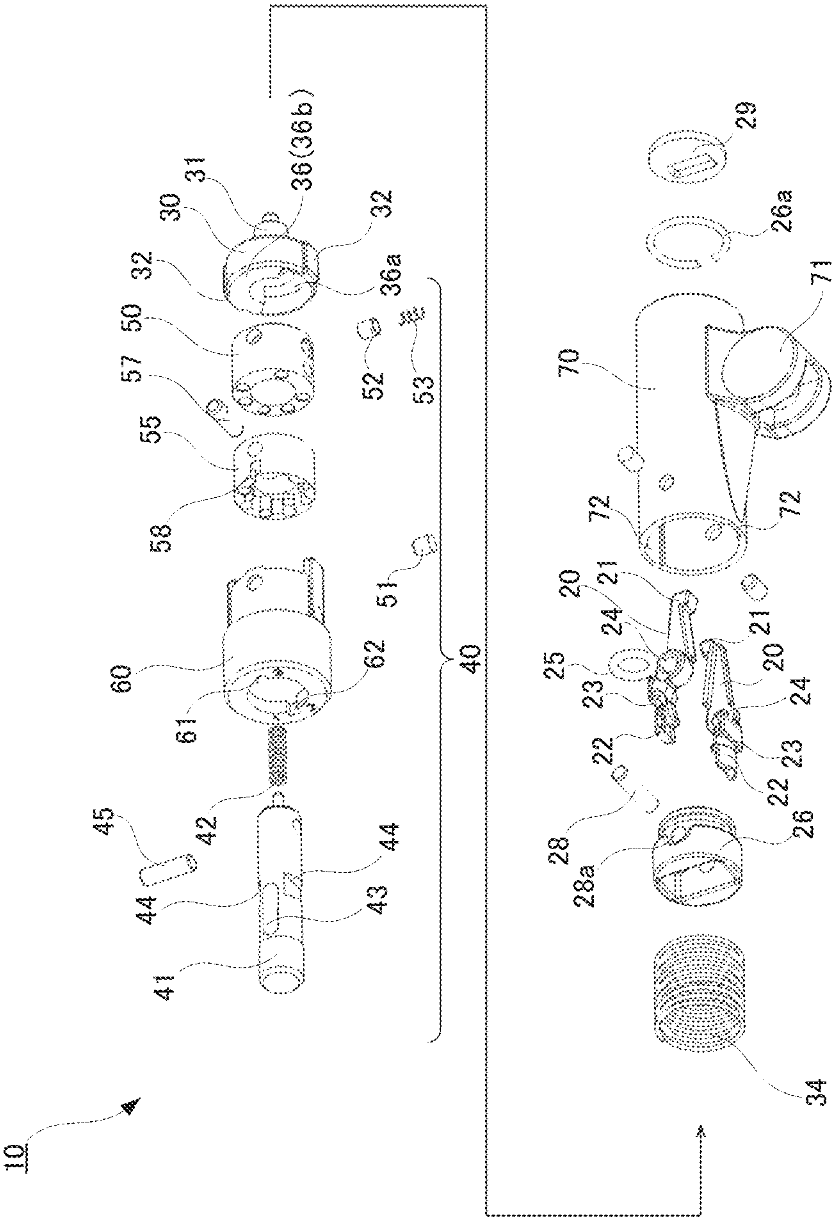
FIG. 9 is an exploded perspective view of the anti-theft connector of the first embodiment viewed from an angle different from that of FIG. 8.
Figure 10:
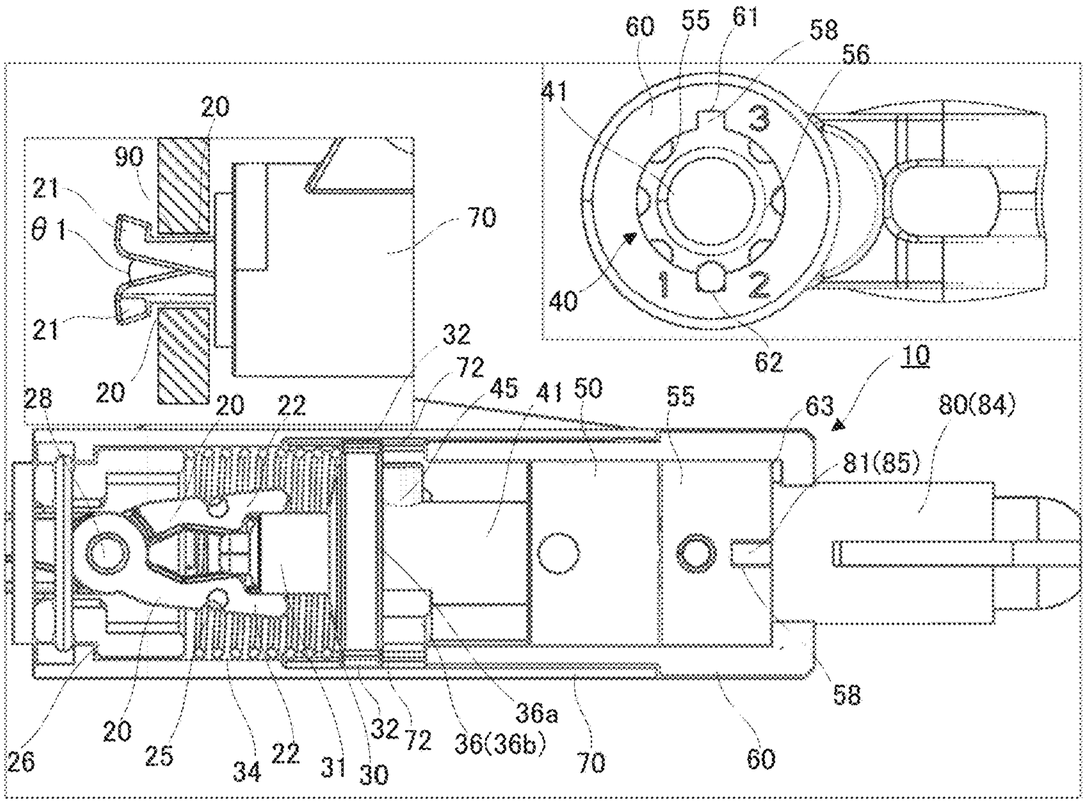
FIG. 10 is an illustration of the anti-theft connector of the first embodiment and shows a state where the connector is installed in a security slot with a narrow opening width.
Figure 11:
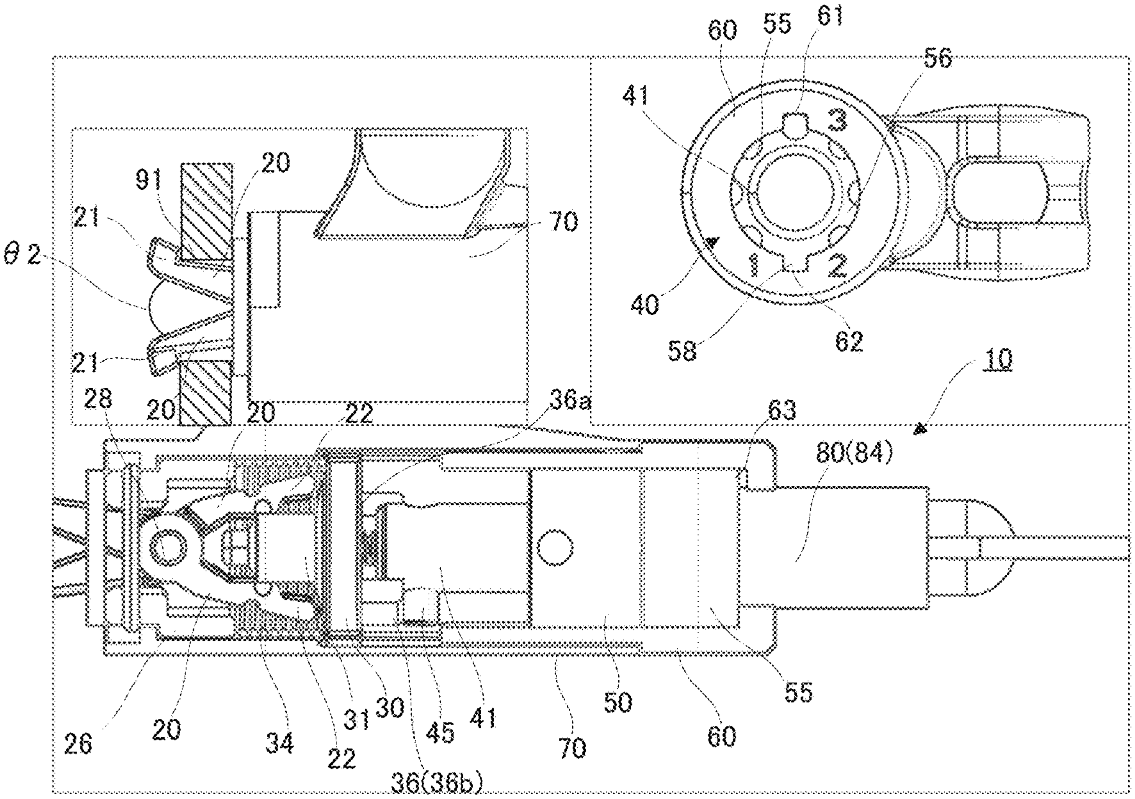
FIG. 11 is an illustration of the anti-theft connector of the first embodiment and shows a state where the connector is installed in a security slot with a wide opening width.
Figure 12:
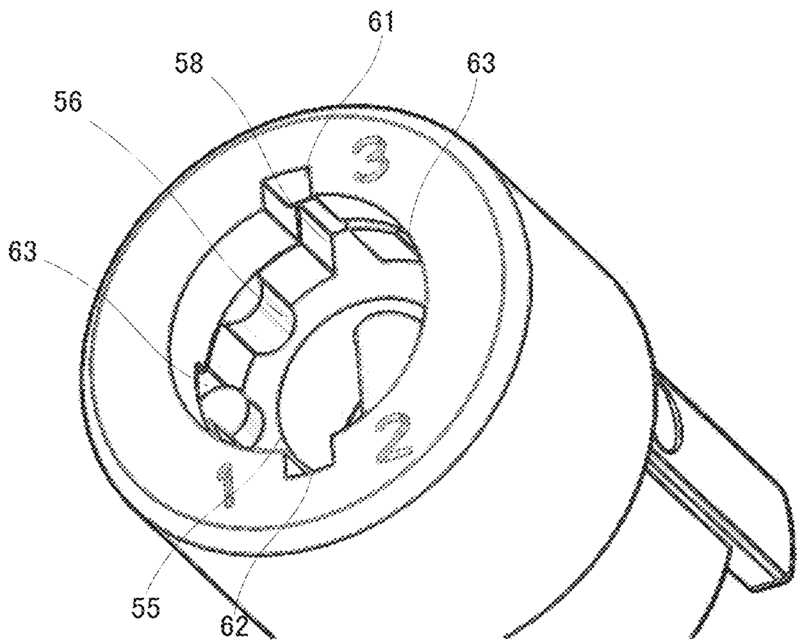
FIG. 12 is a perspective view of a rear cover and a locking means.
Figure 13:
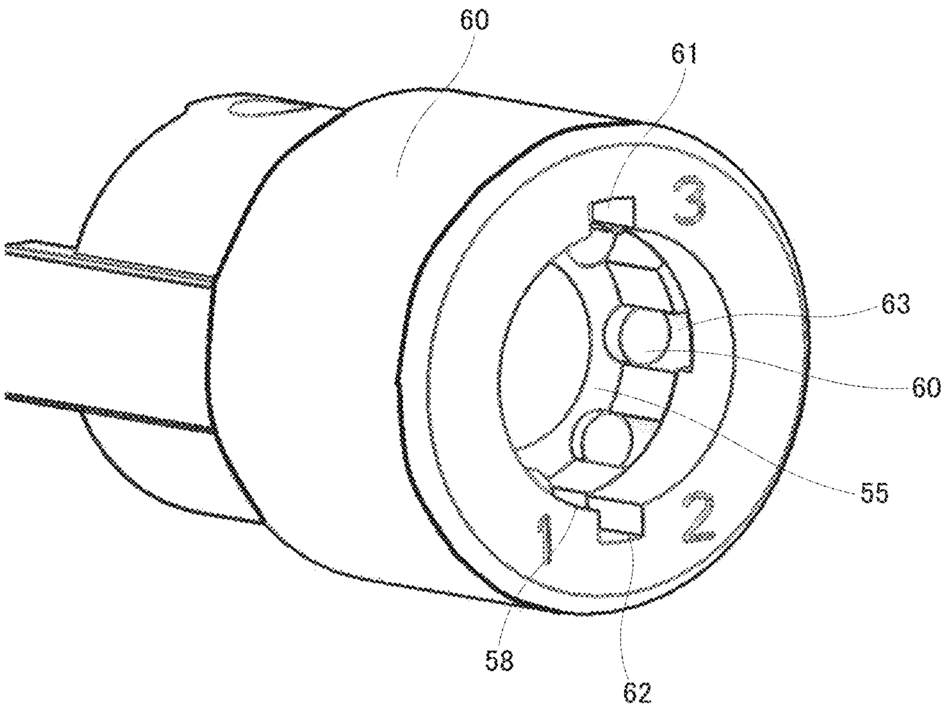
FIG. 13 is a perspective view of a rear cover and a locking means.
Figure 14:
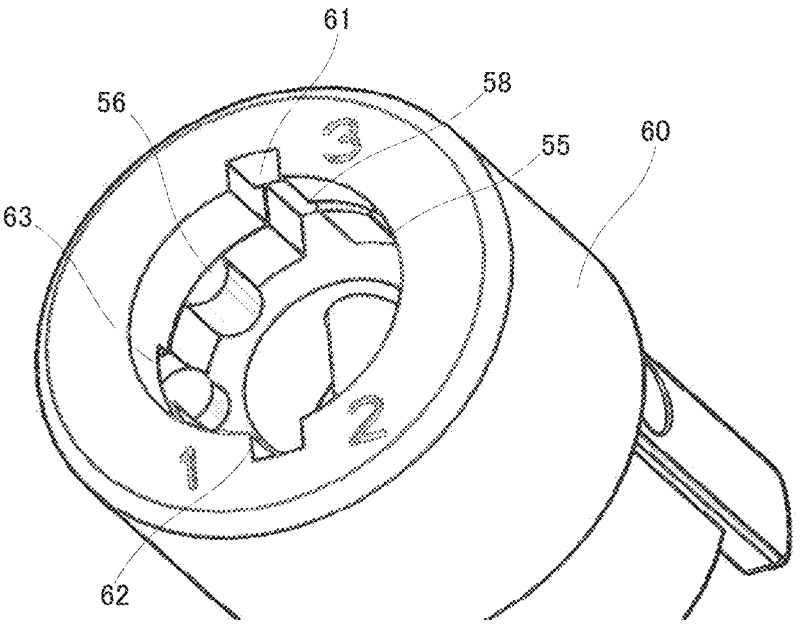
FIG. 14 is a perspective view of a rear cover and a locking means.

FIGS. 2 to 11 shows an anti-theft connector 10 according to one embodiment of the present invention. FIG. 2 is a perspective view of the anti-theft connector viewed from an oblique front and shows a state where the insertion pawls 21, 21 are closed, and FIG. 3 shows a state where the insertion pawls 21, 21 are opened. FIG. 4 is a perspective view of the anti-theft connector 10 viewed from an oblique backward. FIG. 5 is a perspective view of the locking means 40 and shows an unlocked state. FIG. 6 is a perspective view of the locking means 40 and shows a locked state. FIG. 7 shows a state where a key 80 or 84 is inserted into the locking means 40. FIGS. 8 and 9 are exploded perspective views of the anti-theft connector 10. FIG. 10 illustrates a state where the insertion pawls 21, 21 are locked and held at a first opening angle, and FIG. 11 illustrates a state where the insertion pawls 21, 21 are locked and held at a second opening angle. The second opening angle is set to be larger than the first opening angle.

In the following description, the direction where the insertion pawls 21, 21 protrudes from a housing 70 is referred to as the forward end side, and the direction where the locking pin 41 protrudes from the housing 70 is referred to as the base end side.

As shown in FIGS. 2 to 7, the anti-theft connector 10 has the housing 70, and a pair of insertion pawls 21, 21 protrudes from a forward end of the housing 70. A wire connection portion 71 is provided on a body portion of the housing 70, and a wire member (security wire) is connected to the wire connection portion 71. The housing 70 is covered on the base end side with a rear cover 60, and the locking pin 41 protrudes from the center of the rear cover 60. In the illustrated embodiment, as can also be seen in FIGS. 8 and 9, the housing 70 is cylindrical and closed on the forward end side by the insertion piece holder 26 (In FIGS. 2, 3, etc., a plastic cushioning material 29 is attached to the forward end of the insertion piece holder 26.). The insertion piece holder 26 has an opening 27, through which the insertion pawls 21, 21 of the insertion piece 20, 20 protrude. The locking means 40 is disposed inside the rear cover 60 on the base end side.

The internal structure of the anti-theft connector 10 is shown in FIGS. 8 and 9. Inside the cylindrical housing 70, a C-shaped ring 26A is provided on the forward end side, and the insertion piece holder 26 is positionable by the C-shaped ring 26A. The insertion piece holder 26 is internally hollow, opened at the base end side, and closed at the forward end side. The insertion piece holder 26 is formed in its drum portion with a through-hole 28*a*, and a pivot axis 28 (support portion) for supporting the insertion pieces 20, 20 is attached to the holder.

In the insertion piece holder 26, a pair of insertion pieces 20, 20 are pivotally supported by a pivot axis 28. As shown in FIGS. 10 and 11, the insertion pieces 20, 20 have insertion pawls 21, 21 extending in opposite directions from each other, and is engageable with the security slot 90 or 91 formed in the device. Insertion pieces 20, 20 intersect in the insertion piece holder 26 and are formed at the intersected position with support holes 24, 24 through which the pivot axis 28 passes. Insertion pieces 20, 20 are formed on the outer surface of the base 22, 22 with recesses 23, 23, into which a rubber-like insert piece biasing means 25 is fitted (see also FIG. 1). This biasing means acts on the bases 22, 22 toward the direction of approaching each other, i.e., decreasing the opening angle of the insertion pawls 21, 21.

The housing 70 has a coil spring interposed therein as a means 34 for biasing the angle adjusting means 30. The biasing means 34 for biasing the angle adjusting means 30 has its forward end side in contact with the insertion piece holder 26 and its base end side in contact with the angle adjusting means 30, thus always biasing the angle adjusting means 30 toward the base end side.

The angle adjusting means 30 is a member that controls the opening angle of the insertion pieces 20, 20 described above while the locked state is retained. The angle adjusting means 30 has, for example, a shaft-shaped angle adjustment piece 31. As explained in the basic constitution above and FIG. 1, the angle adjustment piece 31 is adapted to adjust the opening angle of the insertion pieces 20,20 by changing the depth of enter in between the bases 22, 22.

The opening angle of the insertion pieces 20, 20 can be adjusted to the first opening angle θ1 corresponding to the opening width 4.5 mm of the security slot 90 by shallowly inserting the angle adjustment piece 31 in between the bases 22, 22 of the insertion pieces 20, 20, as shown in FIG. 10 (FIG. 1(*b*)). The opening angle of the insertion pieces 20, 20 can be adjusted to the second opening angle θ2 corresponding to the opening width 6 mm or 7 mm of the security slot 91 by deeply inserting the angle adjustment piece 31 in between the bases 22, 22 of the insertion pieces 20, 20, as shown in FIG. 11 (FIG. 1(*c*)). When the angle adjustment piece 31 is retracted from the bases 22, 22 of the insertion pieces 20, 20, the insertion pieces 20, 20 are forced in the closing direction by the insertion piece biasing means 25 and brought into a closed sate as shown in FIG. 2 and FIG. 1(*a*).

The angle adjusting means 30 has a semi-circular rib 36 on its base face, as shown in FIGS. 9 to 11. The rib 36 comprises a concave portion 36*a* and a convex portion 36*b*, wherein the convex portion 36*b* is a portion where the rib 36 is formed and the concave portion 36*a* is a portion wherein the rib 36 is not formed. The concave portion 36*a* and convex portion 36*b* are in contact with an adjuster member 45, which will be described later, to set the locking position of the angle adjusting means 30 to one of a first position shown in FIG. 10 (FIG. 1(*b*)) and a second position shown in FIG. 11 (FIG. 1(*c*)). In the unlocked state, the angle adjusting means 30 is moved to a third position (FIG. 1(*a*)) that is retracted from the insertion piece 20, 20.

The adjuster member 45 is provided on the locking pin 41 at the base end side of the angle adjusting means 30. The locking pin 41 is slidable in the axial direction and rotatable about a shaft in the housing 70. Specifically, the locking pin 41 is formed with a slide groove 43 extending in the axial direction into which a slide shaft 57 of a second rotor 55 is loosely fitted, whereby the locking pin 41 is slidable against a second rotor 55 and also can be rotated with the second rotor 55 in the housing 70.

The locking pin 41 has two locking grooves 44, 44 at 180 degrees different positions on the periphery thereof. In the position where the angle adjusting means 30 is pushed into toward the forward end of the housing 70 by the locking means 40, the first rotor's return control shaft 52 enters into the locking groove 44 and the locking pin 41 is locked and held. When the locking pin 41 is rotated from this state, the return control shaft 52 is released from the locking groove 44 and the locking pin 41 is unlocked. When the locking pin 41 is unlocked, the locking pin 41 retracts because the locking pin 41 is pushed toward the base end side by a locking pin biasing means 42 such as a coil spring provided at the front tip.

The adjuster member 45 on the lock pin 41 may be a shaft member (see FIGS. 10 and FIG. 11) disposed orthogonally to the axial direction on the forward end side of the locking pin 41, and is rotatable and slidable within the housing 70, together with the locking pin 41. As shown in FIG. 10, when the locking pin 41 is pushed toward the forward end side in the state that the adjuster member 45 faces the concave portion 36*a* of the angle adjusting means 30, the locking position of the angle adjusting means 30 is moved to the first position shown in FIG. 10. When the locking pin 41 is rotated by 180 degrees together with the second rotor 55 (explained later), the adjuster member 45 is moved to a position facing the convex portion 36*b* of the angle adjustment means 30. When the locking pin 41 is pushed in from this state, the angle adjusting means 30 is locked. This locked position is a second position. When the locking pin 41 is unlocked from any position by the locking means 40, the locking pin 41 retracts toward the base end side by the locking pin biasing means 42.

The sliding and rotating of the locking pin 41 is controlled by the locking means 40, which will be described next.

The locking means 40 may be a tubular pin tumbler lock, for example. The tubular pin tumbler lock includes a first rotor 50 positioned at the forward end in the housing 70 and a second rotor 55 positioned at the base end. Any known type of the tubular pin tumbler lock can be employed. So, a detailed description of the structure and operation of the tubular pin tumbler lock is omitted. The first rotor 50 is secured to the rear cover 60 and the housing 70 by a fixed pin 51, and is not rotatable. The second rotor 55 is rotatable with respect to the first rotor 50 in the unlocked state and is not rotatable with respect to the first rotor 50 in the locked state.

The rotation of the first rotor 50 and the second rotor 55 is regulated by cord pins 56 accommodated in the rotors. The cord pins of the second rotor 55 are shown in FIGS. 10 and 11, and FIGS. 12 to 14. The second rotor 55 has a groove 58 recessed into its base end side. The second rotor 55 has an engagement groove 58 recessed in the inner circumference, as shown in FIGS. 11 to 15. In the state where the engagement groove is aligned with any of gap holes 61, 62 formed on the base end surface of a rear cover 60, keys 80, 84 can be inserted and removed.

In this embodiment, the gap holes 61 and 62 are formed in two positions 180 degrees offset. One gap hole 62 is marked with signs "1" and "2," and the other gap hole 61 is marked with sign "3." Depending on whether the engagement groove 58 of the second rotor 55 faces either of the gap holes 61, 62, the opening angle of the insertion pawls 21, 21 is set to the first opening angle θ1 and the second opening angle θ2. In this embodiment, the first opening angle θ1 is set by opposing the engagement groove 58 to the gap hole 61 marked with the sign "3," as shown in FIG. 10, and the second opening angle θ2 is set by opposing the engagement groove 58 to the gap holes 62 marked with the sign "1" and "2," as shown in FIG. 11.

Figure 15:
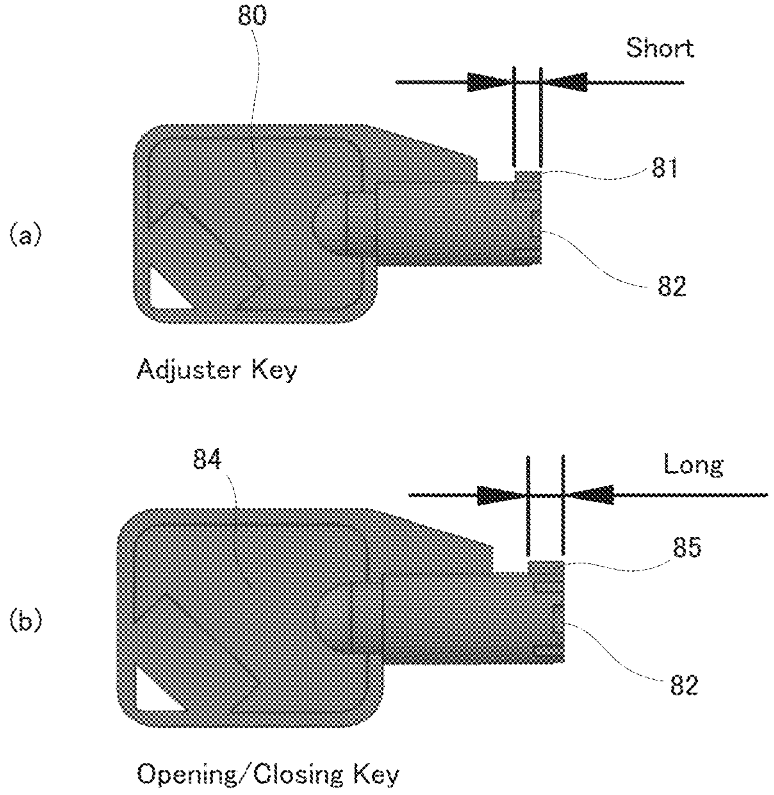
FIG. 15 is a side elevation view of a key wherein (a) shows an adjuster key and (b) shows an opening/closing key.

In this embodiment, the keys for locking and unlocking the locking means 40 may be the adjuster key 80 for adjusting the opening angle of the insertion piece 20, 20 as shown in FIG. 15(*a*), and the opening/closing key 84 for performing normal locking and unlocking as shown in FIG. 15(*b*). Both keys 80, 84 are provided with latch pieces 81, 85 that fits into the engagement groove 58 through the gap hole 61 or 62 of the rear cover 60 aligned with the engagement groove 58 of the locking means 40. The second rotor 55 can be rotated with respect to the first rotor 50 by inserting the keys 80, 84 into the second rotor 55, adjusting the height of cord pins 56 with key grooves 82 formed in the keys 80, 84, and aligning the height of cord pins 56. On the other hand, the keys 80, 84 can be pulled out by aligning the engagement groove 58 with the gap hole 61 or 62. When the keys 80, 84 are pulled out, the cord pins on the first rotor 50 side enters the second rotor 55 and the rotation of the second rotor 55 is restricted.

Figure 16:
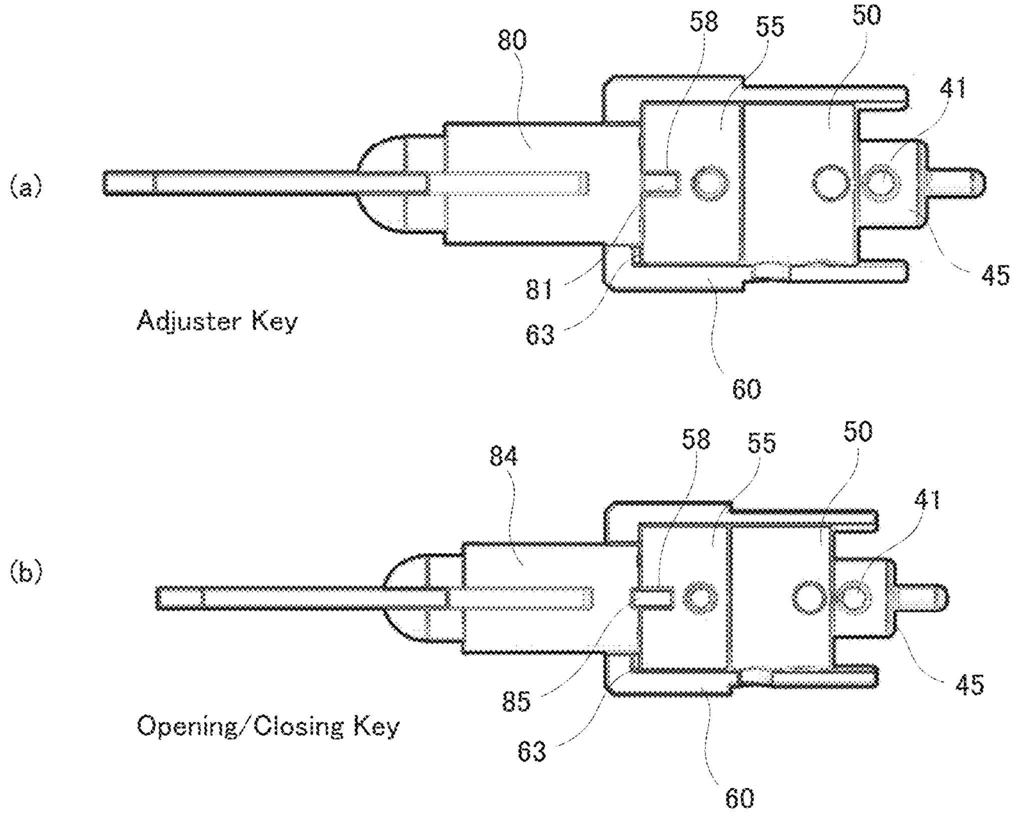
FIG. 16 is a sectional view showing a state where the key is inserted into the locking means wherein (a) shows that the adjuster key is inserted and (b) shows that the opening/closing key is inserted.

In this embodiment, as shown in FIGS. 10 to 14, 16 and 17, the rear cover 60 has a stepped groove 63 on a portion of the inner surface facing the second rotor 55. The stepped grooves 63 are formed at two locations. To be specific, the step groove 63 is located about 90 degrees clockwise from the gap hole 61 marked with the sign "3" in FIGS. 12 and 13, and is located about 90 degrees clockwise from the gap hole 62 marked with the sign "1" and "2" in FIG. 14. As shown in FIG. 16(*a*), the adjuster key 80 may be a length that accommodates the latch piece 81 without protruding from the engagement groove 58 in the state where the key 80 is inserted into the second rotor 55. This allows the adjuster key 80 to rotate the second rotor 55 at least 180 degrees. On the other hand, as shown in FIG. 15 and FIG. 16(*b*), the latch piece 85 of the opening/closing key 84 is formed longer than the latch piece 81 of the adjuster key 80. More specifically, the latch piece 85 is long enough for the base end to protrude into the stepped groove 63. Thus, in the state where the opening/closing key 84 is inserted into the second rotor 55, the latch piece 85 protrudes from the engagement groove 58 toward the stepped groove 63 side, so that the opening/ closing key 84 can rotate within a range of approximately 90 degrees where the stepped groove 63 is formed, but further rotation is restricted.

When the adjuster key 80 is inserted into the locking means 40 as shown in FIG. 16(*a*), the latch piece 81 is fully accommodated in the engagement groove 58 of the second rotor 55, and the second rotor 55 can be freely rotated. The adjuster key 80 can, for example, rotate the second rotor 55 from the position of the gap hole 61 marked with sign "3" to the position of the gap hole 62 marked with signs "1" and "2" in the engagement groove 58, or from the position of the gap hole 62 marked with signs "1" and "2" to the position of the gap hole 61 marked with sign "3" in the engagement groove 58. This allows the adjuster key 80 to unlock the locking means 40, and also to rotate the locking pin 41 on the adjuster member 45 by 180 degrees.

On the other hand, the latch piece 85 protrudes toward the stepped groove 63 side, as shown in FIG. 16(*b*), so that the opening angle of the opening/closing key 84 is restricted. Therefore, the opening/closing key 84 can unlock the locking means 40, but cannot rotate the locking pin 41 by 180 degrees.

The anti-theft connector 10 of the above-mentioned configuration can be used in the following manner.

When the anti-theft connector 10 is used in the security slot 90 with an opening width of 4.5 mm, the adjuster key 80 shown in FIG. 15(*a*) is inserted into the locking means 40 to rotate the key 80. As shown in FIG. 16(*a*), the latch piece 81 of the adjuster key 80 has a length that does not extend from the engagement groove 81. Therefore, the adjuster key 80 allows the second rotor 55 to rotate freely. Then, as shown in FIG. 10, the engagement groove 58 of the second rotor 55 is aligned with the gap hole 61 marked with sign "3" and the adjuster key 80 is pulled out. The engagement groove 58 of the second rotor 55 is then aligned with the gap hole 61 marked with sign "3." This causes the locking pin 41 and the adjuster member 45 to rotate with the second rotor 55, so that the adjuster member 45 is moved to the position opposite the concave portion 36*a* of the angle adjusting means 30 as shown in FIG. 9.

As shown in FIG. 1(*a*) and other figures, the insertion piece biasing means 25 holds the insertion pieces 20, 20 in the closed state where the insertion pawls 21, 21 are closed. From this state, the insertion pawls 21, 21 are inserted into the security slot 90 and the locking pin 41 is pushed in. This causes the adjuster member 45 to push the angle adjusting means 30, as shown in FIG. 10. But as the adjuster member 45 faces the concave portion 36*a* of the angle adjusting means 30, the amount to be pushed in by the adjuster member 45 is small. Thus, the angle adjustment piece 31 pushed by the adjuster member 45 is inserted shallowly in between the basses 22, 22 of the insertion pieces 20, 20. This causes the insertion pieces 20, 20 to open the first opening angle θ1 to the width of the security slot 90 (see FIG. 1(*b*)), and the insertion pawls 21, 21 engage with the security slot 90. The locking pin 41 is prevented from retracting because the return control shaft 52 enters into the locking groove 44, thus locking and holding the insertion pawls 21, 21. Thus, the anti-theft connector 10 can be connected to the security slot 90 of the device. The device can be connected to a desk, pillar, etc. via a wire member (not shown) and the anti-theft connector 10 by connecting the wire member of the anti-theft connector 10 to the desk, etc., thus preventing the device from theft.

To remove the anti-theft connector 10 from the security slot 90, the opening/closing key 84 (adjuster key 80 can also be used) is inserted into the locking means 40 to turn the second rotor 55 by approximately 90 degrees, thus releasing the locked state. Consequently, the locking pin 41 rotates, the return control shaft 52 disengages from the locking groove 44, and the locking pin 41 is retracted toward the base end side by the locking pin biasing means 42. Due to the retraction of the locking pin 41, the angle adjusting means 30 is moved to the base end side by the means 34 for biasing the angle adjusting means 30, and the angle adjusting piece 31 is removed from the portion between the bases 22, 22 of the insertion pieces 20, 20. Since the insertion pieces 20, 20 are urged in the closing direction by the insertion piece biasing means 25, the angle adjustment piece 31 is removed, so that the insertion pieces 20, 20 are closed (see also FIG. 1(*a*)), and can be removed from the security slot 90.

When the anti-theft connector 10 is used in the security slot 91 with an opening width of 6 mm or 7 mm, the opening angle of the insertion pawls 21, 21 is required to set to the second opening angle θ2. In this case, the adjuster key 80 is inserted into the locking means 40 to turn the key 80, and the engagement groove 58 of the second rotor 55 is aligned with the gap hole 62 marked with signs "1" and "2," so that the locking pin 41 and the adjuster member 45 rotates with the second rotor 55, and the adjuster member 45 moves to the position opposite the convex portion 36*b* of the angle adjusting means 30 as shown in FIG. 11.

As shown in FIG. 1 and other figures, the insertion piece biasing means 25 holds the insertion pieces 20, 20 in the closed state where the insertion pawls 21, 21 are closed. From this state, the insertion pawls 21, 21 are inserted into the security slot 91 and the locking pin 41 is pushed in. This causes the adjuster member 45 to push the angle adjusting means 30, as shown in FIG. 11. But as the adjuster member 45 faces the convex portion 36*b* of the angle adjusting means 30, the amount to be pushed in by the adjuster member 45 is larger than the amount in the case where the adjuster member 45 faces the concave portion 36*a* as mentioned above. Thus, the angle adjustment piece 31 pushed by the adjuster member 45 is inserted deeply in between the basses 22, 22 of the insertion pieces 20, 20. This causes the insertion pieces 20, 20 to open to the second opening angle θ2 to the width of the security slot 91 (see also FIG. 1(*c*)), and the insertion pawls 21, 21 engage with the security slot 91. The locking pin 41 is prevented from retracting because the return control shaft 52 enters into the locking groove 44, thus locking and holding the insertion pawls 21, 21. The anti-theft connector 10 can be connected to the security slot 91 of the device, thus preventing the device from theft.

To remove the anti-theft connector 10 from the security slot 91, the opening/closing key 84 (adjuster key 80 can also be used) is inserted into the locking means 40 to turn the second rotor 55 by approximately 90 degrees, thus releasing the locked state. Consequently, the locking pin 41 retracts, and the insertion pieces 20, 20 are closed (see FIG. 1(*a*)), as described above. Then, the insertion pieces 20, 20 can be removed from the security slot 91.

According to the invention, the user can use the adjuster key 80 in adjusting the opening angle of the insertion pieces 20, 20 to the opening width of the security slot. Therefore, there is no need to prepare a plurality of anti-theft connectors to the opening width of the security slot. Once the opening angle is adjusted by the adjuster key 80, the opening/closing key 84 cannot be used for the purpose other than to unlock it. Thus, if the user unfamiliar with the use of the anti-theft connector 10 can be given only the opening/closing key 84, the anti-theft connector is prevented from being used at an opening angle that does not match the opening width.

In the above embodiment, the locking means 40 is a tubular pin tumbler lock, but it may be a cylinder lock, a dial lock or the like. The locking pin 41 and the adjuster member 45 may be positioned by a wire member, padlock, etc.

The housing 70 is not limited to a cylindrical shape, but may also be a rectangular shape, etc.

SECOND EMBODIMENT

In the first embodiment, an adjuster member 45 is provided on the locking pin 41, and is adapted to adjust the opening angle of the insertion pieces 20, 20 by changing the direction of the adjuster member 45 to change the insertion depth of the angle adjustment piece 31. In the second embodiment, as shown in FIGS. 17 to 21, the adjuster member 45 is threaded onto the angle adjusting means 30, allowing the adjuster member 45 to rotate with respect to the angle adjusting means 30.

In the second embodiment of the anti-theft connector 10, the length of the angle adjustment piece 30 and the adjuster member 45 can be adjusted by changing the relative position of the angle adjusting means 30 to the adjuster member 45, thus making the insertion depth of the angle adjustment piece 31 adjustable when the locking pin 41 is pushed in.

Figure 17:
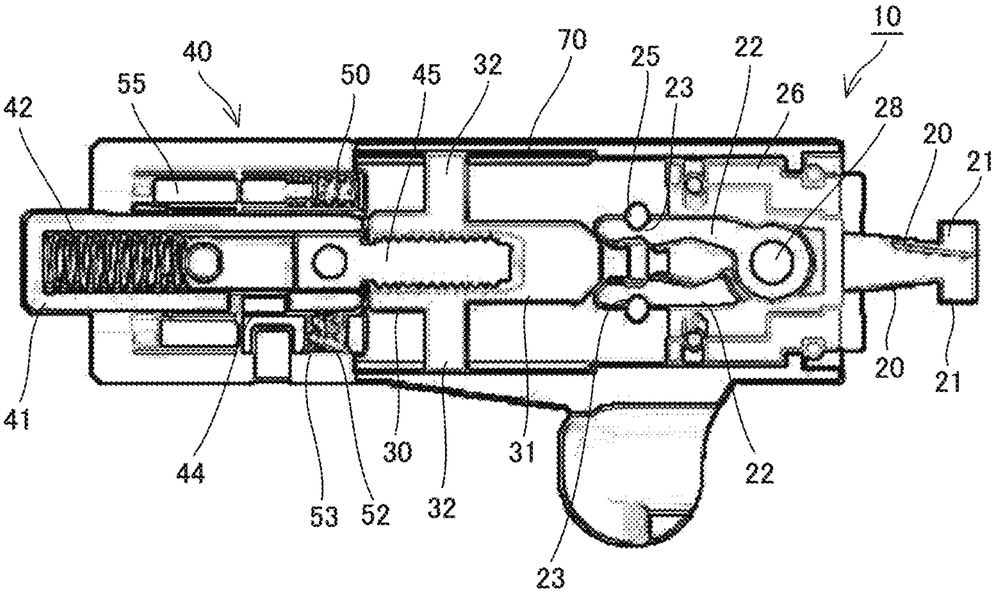
FIG. 17 is sectional view showing an unlocked state of the anti-theft connector according to the second embodiment.
Figure 18:
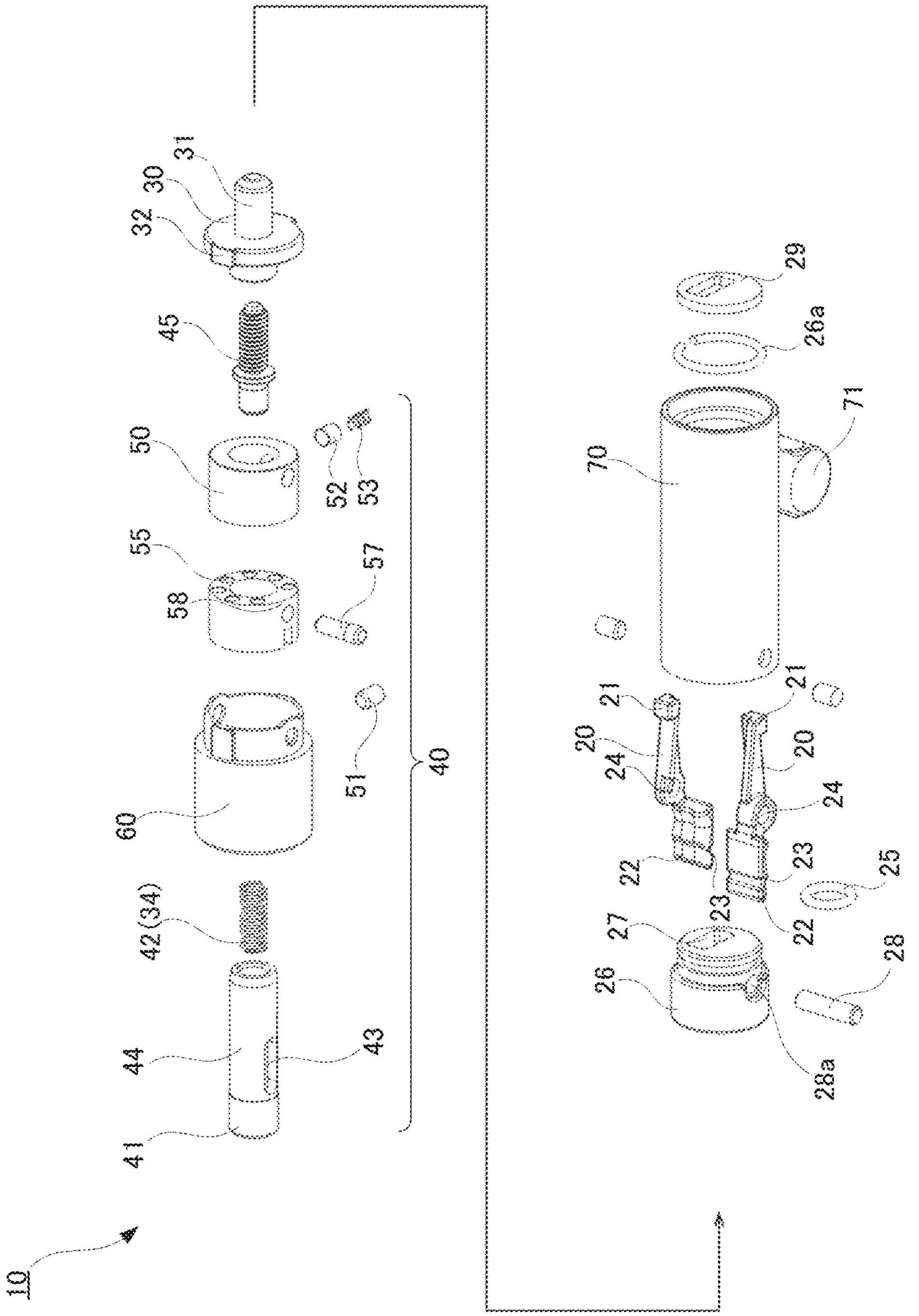
FIG. 18 is an exploded perspective view of the anti-theft connector according to the second embodiment.

The angle adjusting means 30, as shown in FIGS. 17 and 18, comprises a shaft-like angle adjustment piece 31, and guides 32, 32 protruding from the angle adjustment piece 31 and slidably fitted into guide grooves 72 (see FIG. 17) in the housing 70, so that the angle adjustment piece 31 is movable in parallel to the axial direction within the housing 70.

The angle adjustment piece 31 is formed at the base end thereof with a female thread that is engageable with the adjuster member 45 having a male thread formed at the forward end of the locking pin 41. The locking pin 41 is a bottomed hollow cylinder shape and is internally provided with a locking pin biasing means 42 at the base end side. The locking pin biasing means 42 has a forward end in contact with the slide shaft 57 of the second rotor 55 and is always biasing the locking pin 41 toward the base end side.

As in the first embodiment, the adjuster key 80 is fitted into the locking means 40, and turned a predetermined number of times, whereby the locking pin 41 rotates together with the adjuster member 45, and the relative position of the threaded angle adjustment piece 31 can be adjusted.

Figure 19:
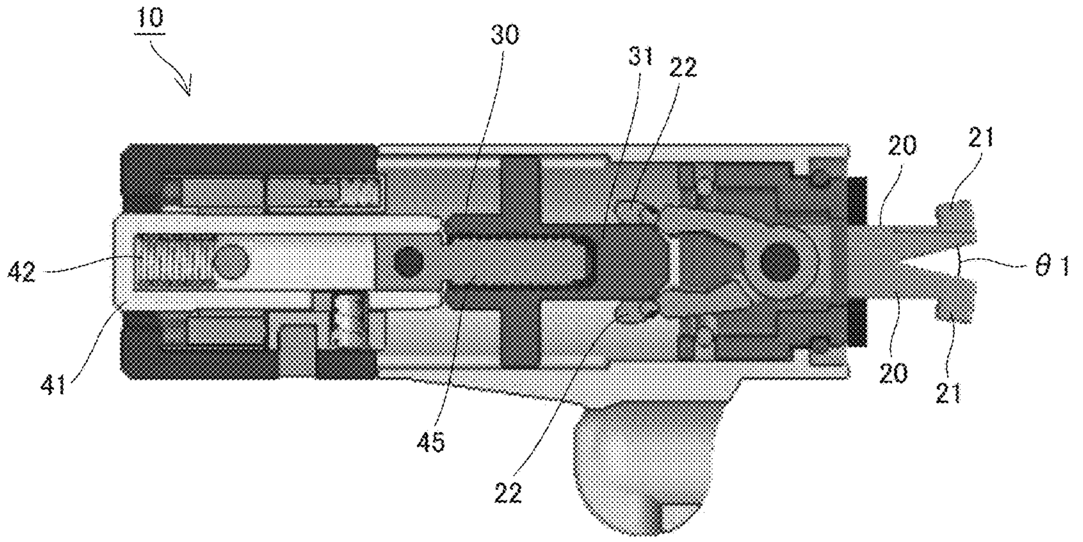
FIG. 19 is a sectional view of the anti-theft connector according to the second embodiment wherein the insertion piece is in a first opening angle of θ1.

FIGS. 17 and 19 show the state where the angle adjustment means 30 is the nearest to the adjuster member 45 and is in the shortest length. FIG. 17 shows the unlocked state and FIG. 19 shows the locked state. In this case, the length of the adjuster member 45 and the angle adjusting means 30 is short. Hence, when the locking pin 41 is pushed in, as shown in FIG. 19, the angle adjustment piece 31 is shallowly inserted into between the bases 22, 22 of the insertion pieces 20, 20. The opening angle of the insertion pieces 20, 20 in this state is referred to as a first opening angle θ1.

Figure 20:
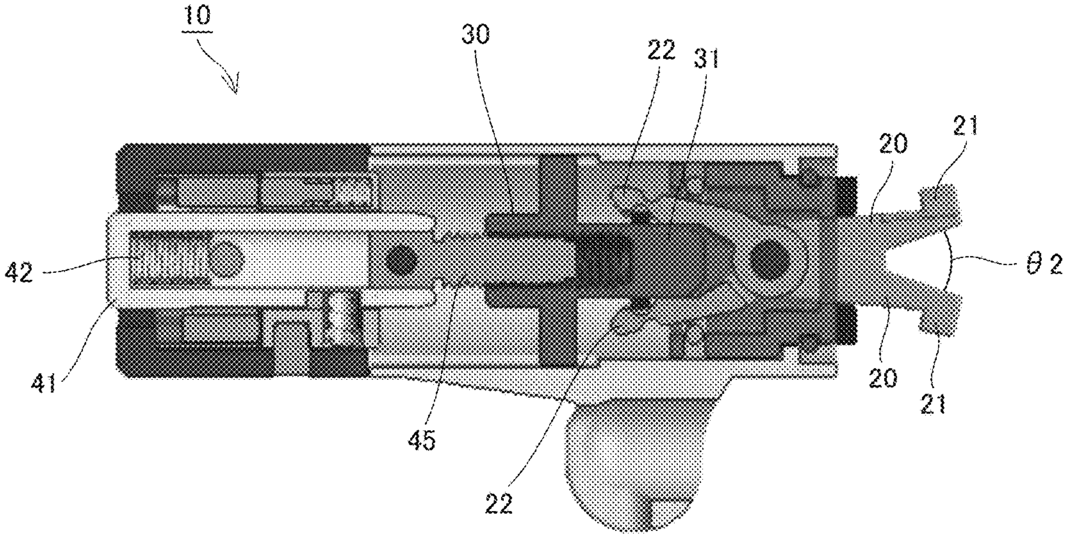
FIG. 20 is a sectional view of the anti-theft connector according to the second embodiment wherein the insertion piece is in a second opening angle of θ2.
Figure 21:
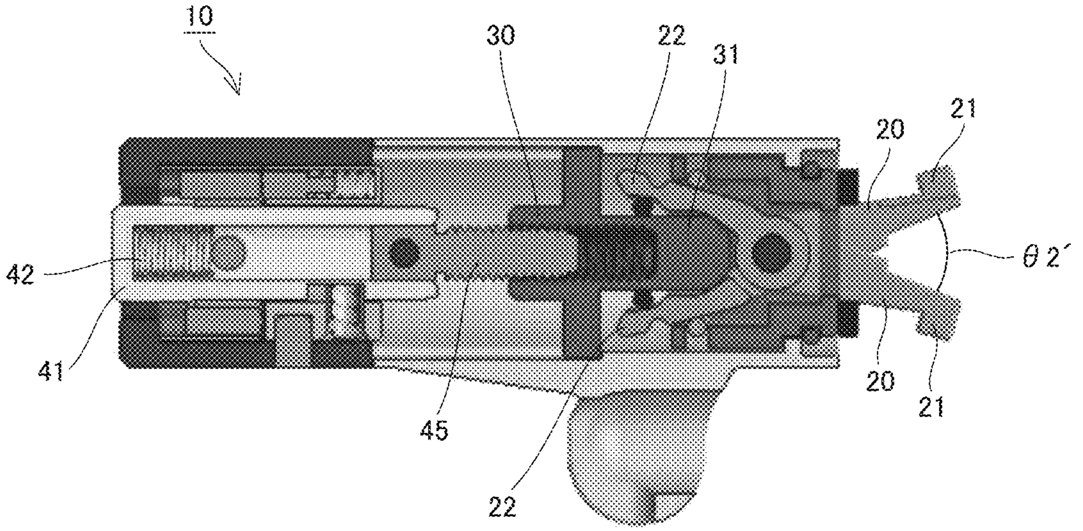
FIG. 21 is a sectional view of the anti-theft connector according to the second embodiment wherein the insertion piece is in an opening angle of θ2'.

On the other hand, the adjuster key 80 can be operated to turn the second rotor 55 a predetermined number of times, as shown in FIGS. 20 and 21, and to change the position of the angle adjustment piece 31 with respect to the adjuster member 45. This allows the angle adjustment piece 31 to change the depth inserted between the bases 22 and 22 in the state where the locking pin 41 is pushed in. Thus, the opening angle of the insert pieces 20, 20 can be adjusted to a second opening angle θ2 (FIG. 20) for the security slot with an opening width of 6 mm, or to an opening angle θ2' (FIG. 21) for the security slot with an opening width of 7 mm.

The opening angle is not limited to the above, but can of course be adjusted to different opening angles.

THIRD EMBODIMENT

As mentioned above, the anti-theft connector of the second embodiment comprises a female thread in the angle adjusting means 30, and a male thread in the adjuster member 45, which are threadedly connected. In the third embodiment, the adjuster member 45 of the first embodiment wherein it protrudes from the locking pin is employed. As shown in FIGS. 22 to 27, a helical cut 33 is formed in the angle adjusting means 30, whereby the relative length of the angle adjusting means 30 and the locking pin 41 can be adjusted. This relative length can be adjusted by rotating the adjuster member 45 with respect to the helical cutout 33 of the angle adjusting means 30. Therefore, this third embodiment is included in the embodiment wherein the angle adjusting means 30 and the adjuster member 45 are threaded, as in the second embodiment.

Figure 22:
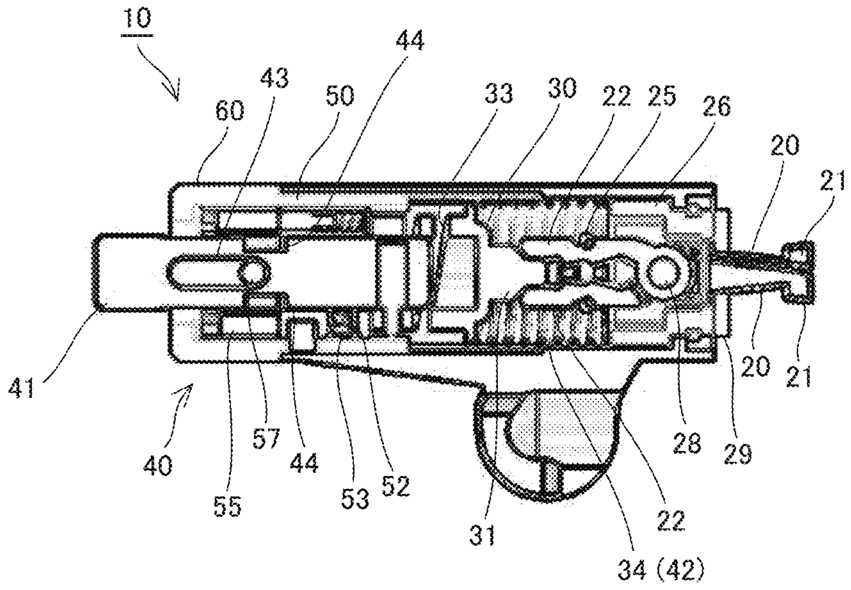
FIG. 22 is a sectional view showing an unlocked state of the anti-theft connector according to the third embodiment.
Figure 23:
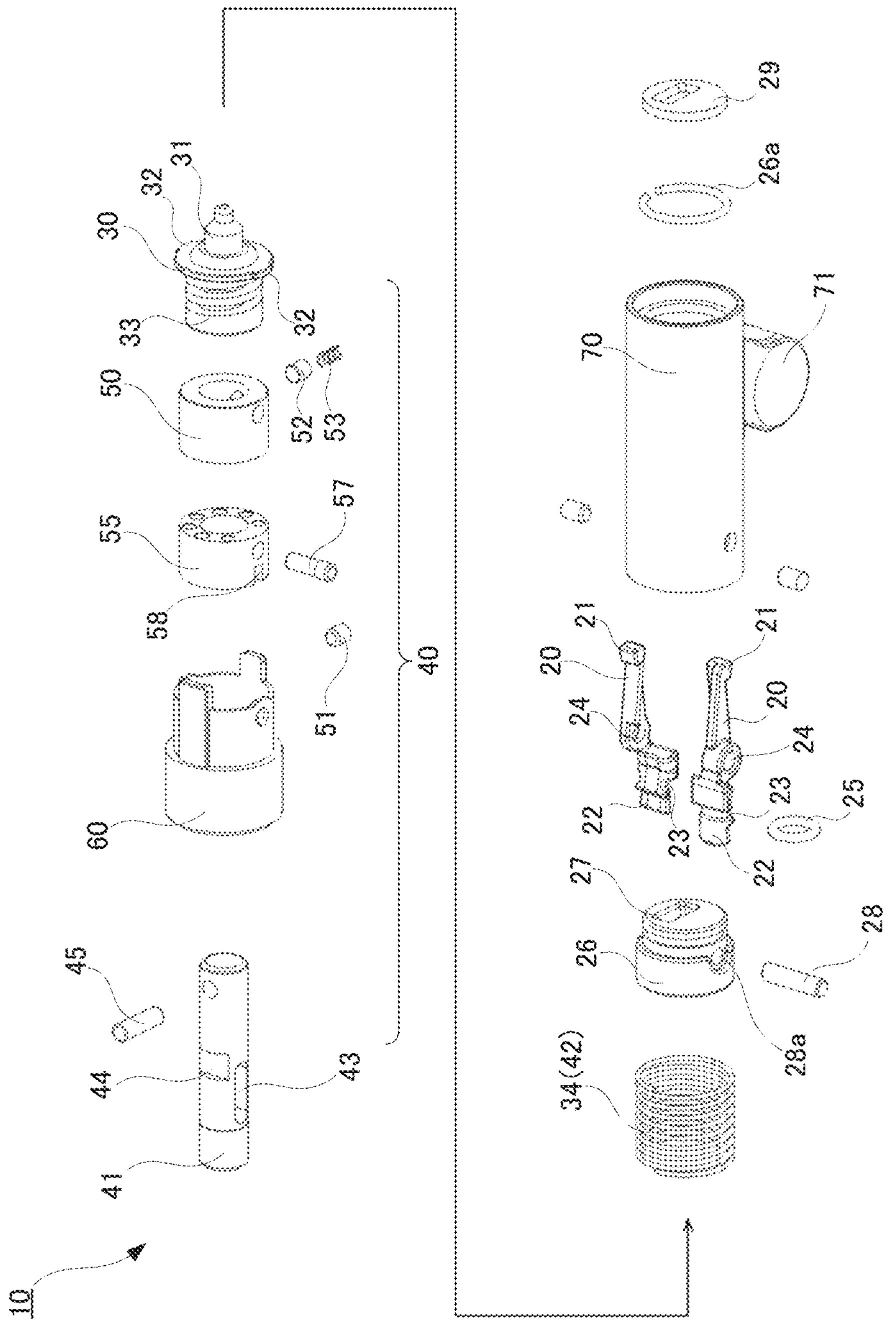
FIG. 23 is an exploded perspective view of the anti-theft connector according to the third embodiment.
Figure 24:
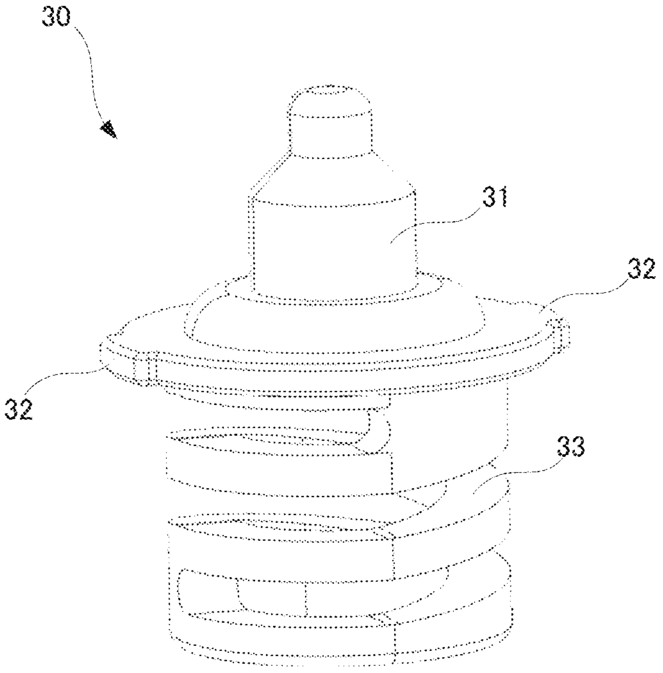
FIG. 24 is a perspective view of the angle adjusting means according to the third embodiment.

The angle adjustment means 30 is provided on its forward end thereof with an angle adjustment piece 31 extending therefrom and is formed on its base end side with a helical cutout 33, as shown in FIGS. 22, 23, and FIG. 24 of an enlarged view. The adjuster member 45 is fitted in the cutout 33.

Figure 25:
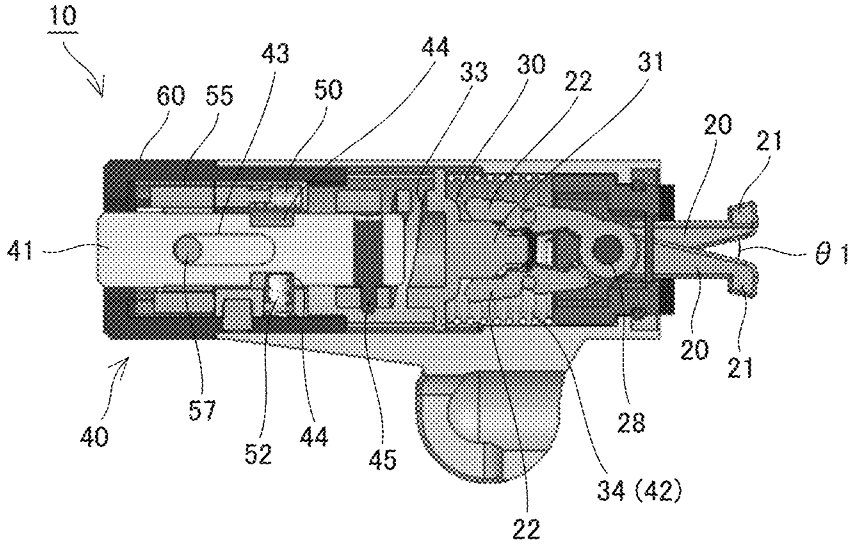
FIG. 25 is a sectional view of the anti-theft connector according to the third embodiment wherein the insertion piece is in a first opening angle of θ1.
Figure 26:
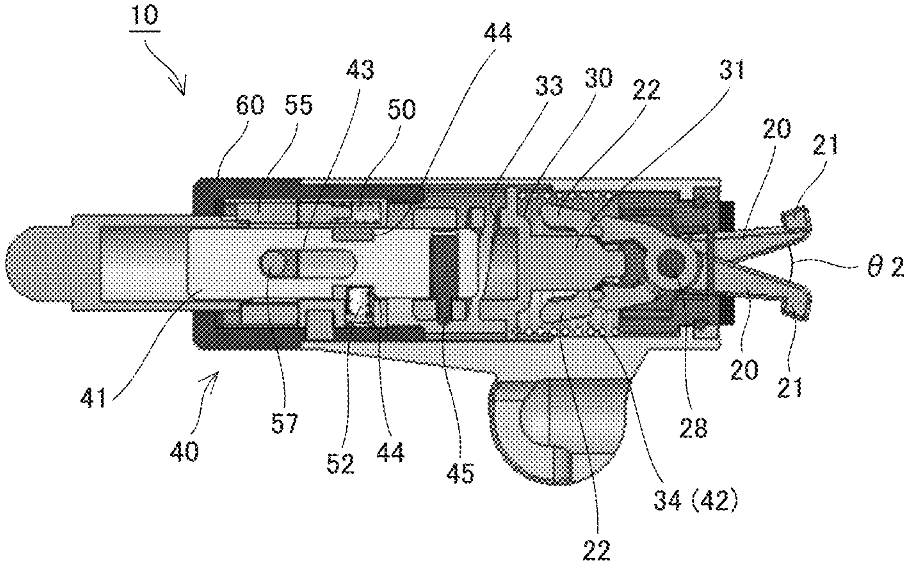
FIG. 26 is a sectional view of the anti-theft connector according to the third embodiment wherein the insertion piece is in a second opening angle of θ2.
Figure 27:
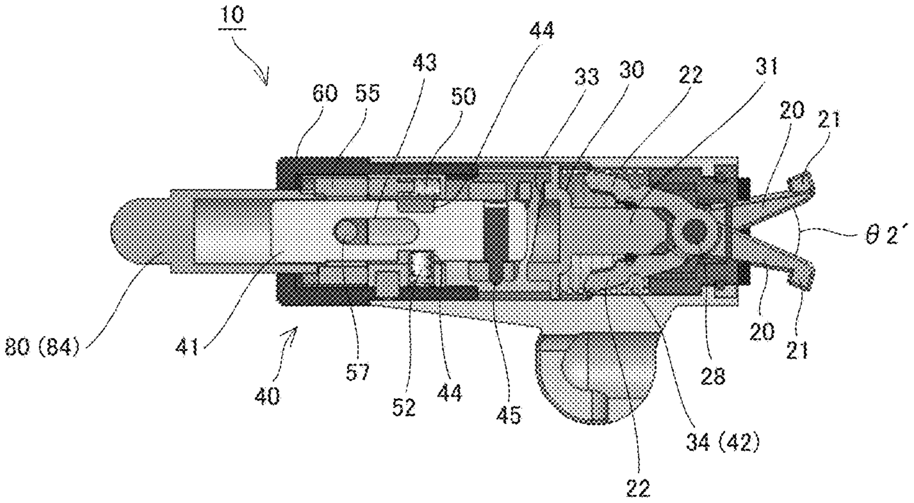
FIG. 27 is a sectional view of the anti-theft connector according to the third embodiment wherein the insertion piece is in an opening angle of θ2'.
Figure 28:
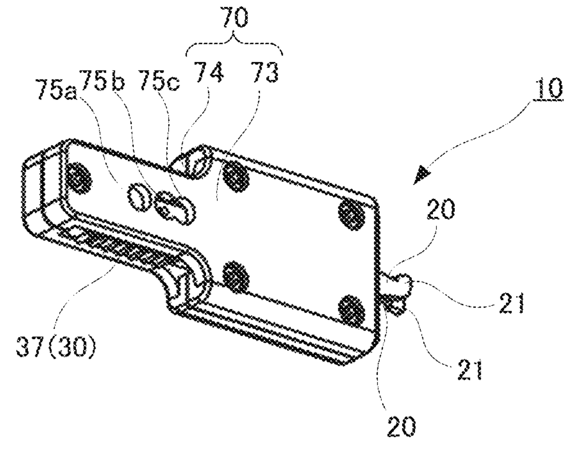
FIG. 28 is sectional view showing an unlocked state of the anti-theft connector according to the fourth embodiment.

When the second rotor 55 is rotated by the adjuster key 80, the locking pin 41 rotates, and the adjuster member 45 also rotates together, as in the second embodiment. At this time, the adjuster member 45 moves within the angle adjusting means 30 while rotating helically within the cutout 33 formed in the angle adjusting means 30. As in the second embodiment, this allows the opening angle of the insert pieces 20, 20 to θ1, θ2, or θ2', as shown in FIGS. 25 to 27.

FOURTH EMBODIMENT

In all of the above embodiments, the opening angle of the insertion pieces 20, 20 is adjusted in advance by the adjuster key 80, and then the locking pin 41 is pushed in to lock the opening angle of the insertion pieces 20, 20. In the fourth embodiment, the user can directly, without using the locking pin 41, adjust the pressing a mount of the angle adjusting means 30 to the opening width of the security slot, as shown in FIGS. 28 to 33.

According to the anti-theft connector 10 in this embodiment, a housing 70 is formed by joining a pair of housing halves 73, 74. The housing halves 73, 74 are formed on their forward end sides with openings 27, 27 for protruding the insertion pawls 21, 21, and are reduced in width on the base end side. Both sides of the reduced base end is opened, and part of the angle adjusting means 30 is exposed from the side portion.

Inside the housing 70, the insertion pieces 20, 20 are forced in the closed direction by the insertion piece biasing means 25 made of a coil spring. The angle adjusting means 30 is disposed at the base end side of the housing 70, and is movable from the base end side to the forward end side.

The angle adjusting means 30 is provided at its forward end with an angle adjustment piece 31 and at both sides of the base end side with a grip portion 37 to be operated by the user. A positioning hole 38 is formed between the grip portions 37 and 37. The positioning holes 38 in the angle adjusting means 30 can be opposed to a plurality of locking holes 75*a*, 75*b*, and 75*c* formed in the housing 70. So, the angle adjusting means 30 can be locked to the housing 70 by bringing the positioning hole 38 into alignment with any of the locking holes 75*a*, 75*b*, or 75*c*, and then passing a padlock or wire member through the aligned positioning holes 38 and the locking holes 75*a*, 75*b*, or 75*c*.

Figure 30:
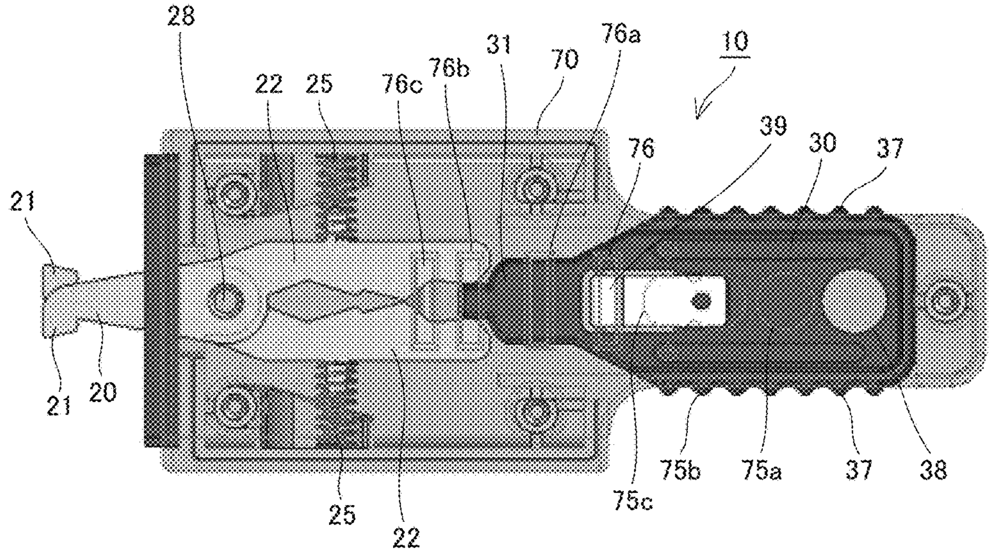
FIG. 30 is a sectional view showing an unlocked state of the anti-theft connector according to the fourth embodiment.
Figure 31:
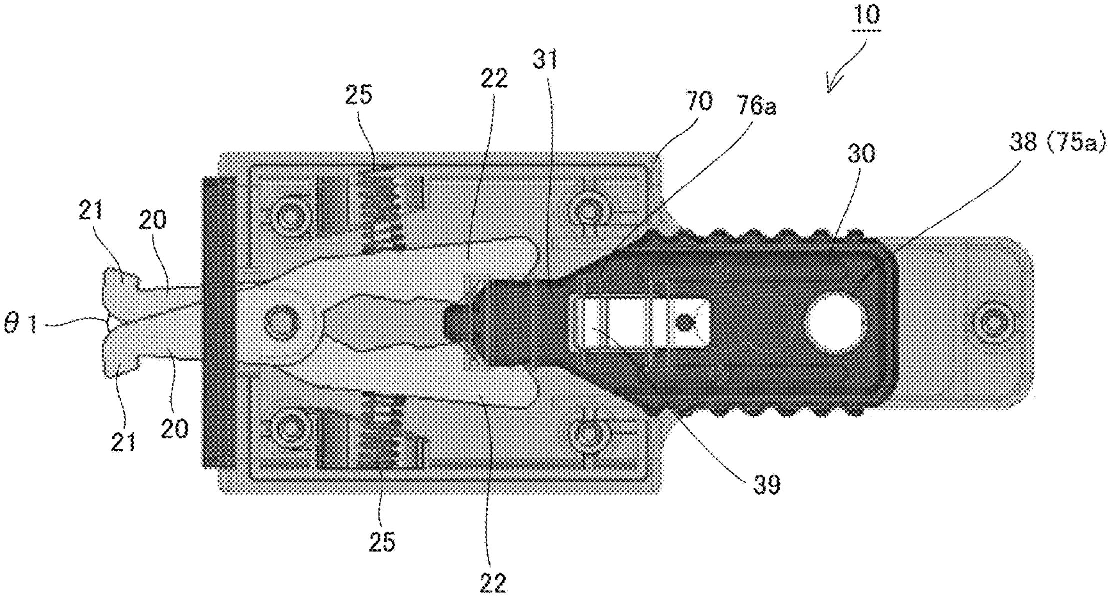
FIG. 31 is a sectional view of the anti-theft connector according to the fourth embodiment wherein the insertion piece is in a first opening angle of θ1.
Figure 32:
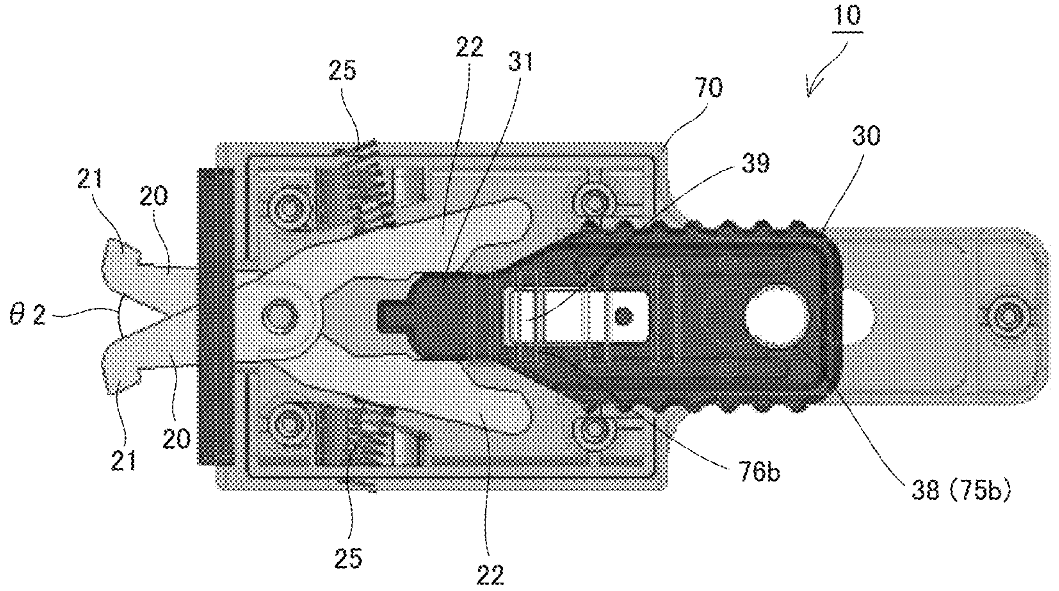
FIG. 32 is a sectional view of the anti-theft connector according to the fourth embodiment wherein the insertion piece is in a second opening angle of θ2.
Figure 33:
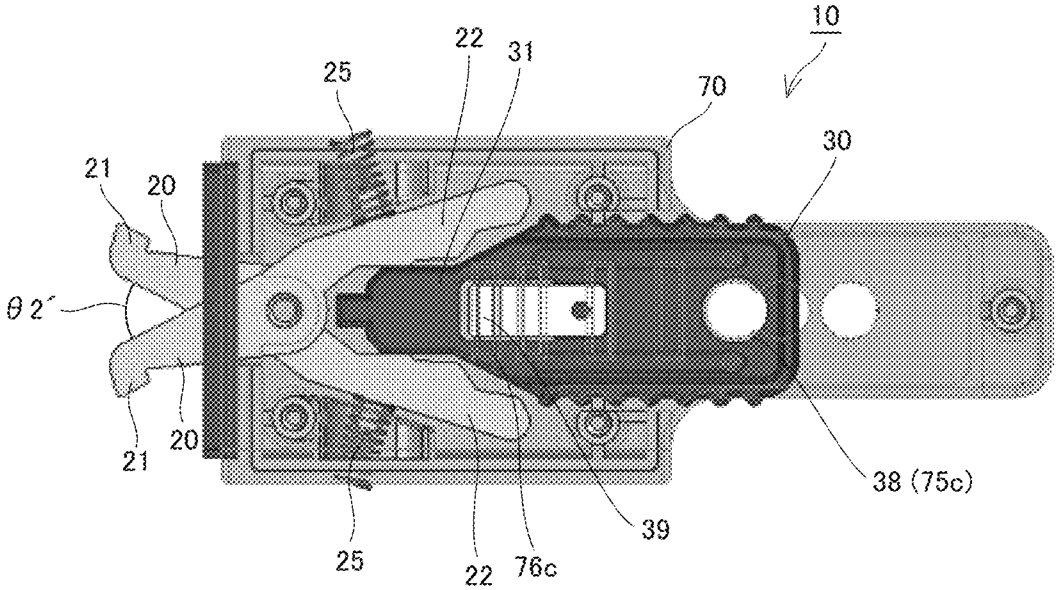
FIG. 33 is a sectional view of the anti-theft connector according to the fourth embodiment wherein the insertion piece is in an opening angle of θ2'.

The opening positions of the locking holes 75*a*, 75*b*, and 75*c* are formed in the position where they face the positioning hole 38 in such a state wherein the angle adjusting means 30 is pushed in from the unlocked position shown in FIG. 30 to the forward end side and the opening angles of the insertion pieces 20, 20 became the first opening angle θ1 and the second opening angles θ2 and θ2' shown in FIGS. 31 to 33. In more particular, when the positioning hole 38 is located facing the locking hole 75*a* on the base side, as shown in FIG. 31, the opening angle of the insertion pieces 20, 20 is adjusted to θ1. When facing the locking hole 75*b*, as shown in FIG. 32, the opening angle is adjusted to θ2. And when facing the locking hole 75*c*, as shown in FIG. 33, the opening angle is adjusted to θ2'.

Figure 29:
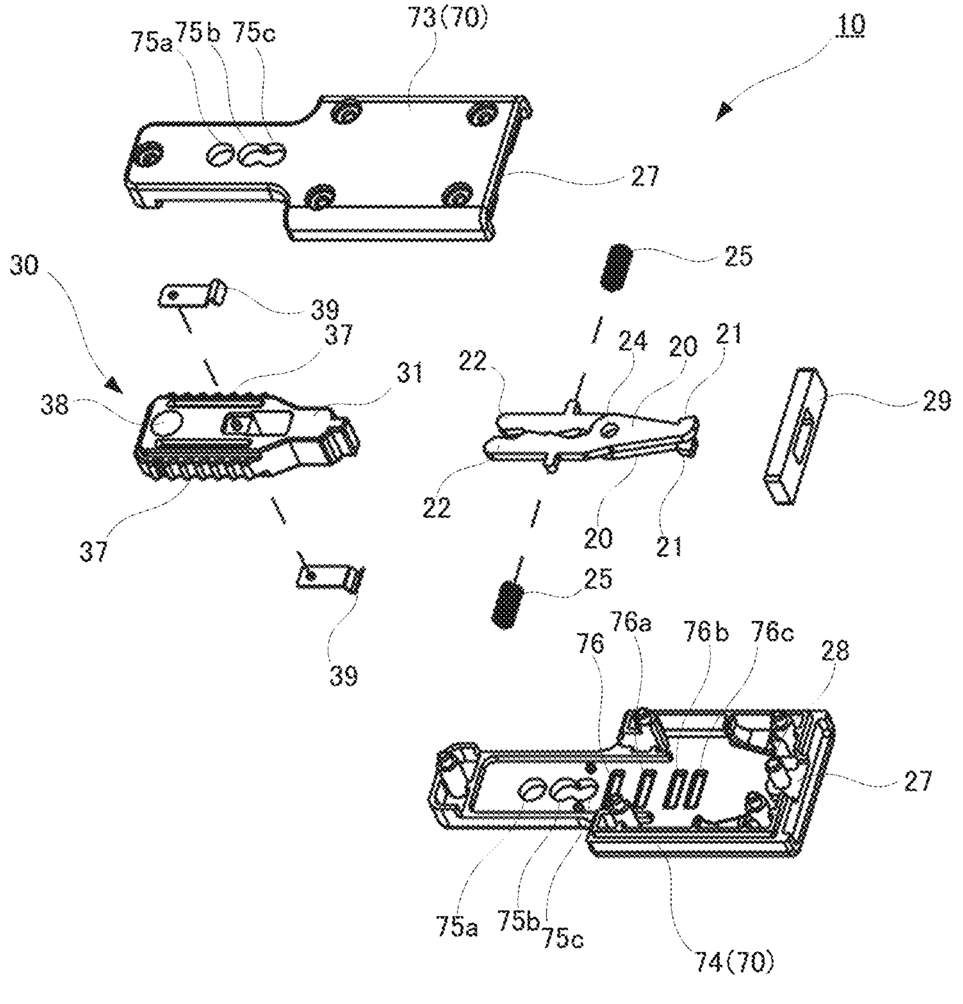
FIG. 29 is an exploded perspective view of the anti-theft connector according to the fourth embodiment.

The angle adjusting means 30 also has a positioning member 39 between the grip portions 37 and 37, as shown in FIG. 29, etc. The positioning member 39 may be an outwardly shaped click plate spring, and is fitted in the positioning recesses 76, 76*a*, 76*b*, and 76*c* formed in the inner surface of the housing halves 73, 74 such that the angle adjusting means 30 can be temporarily positioned. When the angle adjusting means 30 is in the unlocked position (FIG. 30) and in the positions shown in FIGS. 31 to 33 above, the positioning member 39 fits into the positioning recesses 76, 76*a*, 76*b*, and 76*c* to lock the angle adjusting means 30 softly.

In operation, the user fits the insertion pieces 20, 20 into the security slot from the unlocked position shown in FIG. 30, and pushes the grip portion 37 toward the forward end side. This allows the angle adjustment piece 31 to enter in between the bases 22, 22 of the insertion pieces 20, 20 and adjust the opening angle of the insertion pieces 20, 20. When the user further pushes the angle adjusting means 30 to the desired opening angle, the positioning hole 38 is brought into alignment with any of the locking holes 75*a*, 75*b* or 75*c*, depending on the opening width of the security slot, as shown in FIGS. 31 to 33. At this time, as the positioning member 39 fits into the positioning recesses 76*a*, 76*b*, or 76*c*, the position of the angle adjusting means 30 does not shift even if the user takes his/her hand off the grip portion 37.

After this, by passing a padlock, dial lock or wire member through the aligned positioning holes 38 and the locking holes 75*a*, 75*b* or 75*c*, the angle adjusting means 30 is locked to the housing 70, resulting in that the anti-theft connector 10 is coupled to the security slot. The padlock, etc. can be connected to the wire member, and the other end of the wire member can be connected to a desk or a pillar.

The above embodiments are intended to illustrate the invention and should not be interpreted as limiting or reducing the scope of the invention described in the claims. Also, the configuration of each part of the invention is not limited to the above embodiments, and of course, various variations can be made within the technical scope of the claims.

For example, the numerical values, dimensions, numbers, angles, shapes, etc. shown in the above embodiments and drawings are examples, and the present invention is not limited to them. For example, the number of gap holes 61, 62 formed in the rear cover 60, the angle to be formed, or the assigned sign "1," etc. are also examples.

EXPLANATION OF REFERENCE NUMBERS

10 Anti-theft connector
20 Insertion piece
21 Insertion pawl
22 Base portion
30 Angle adjusting means
31 Angle adjustment piece
40 Locking means
41 Locking pin
55 Second rotor
70 Housing
80 Adjuster key
84 Opening/Closing key

The invention claimed is:

1. An anti-theft connector for equipment wherein the anti-theft connector is to be fixed to a security slot of the equipment, the anti-theft connector comprising: a housing having a base end portion and a forward end portion opposite the base end portion, the housing being formed at the forward end portion with an opening;

a first insertion piece having a first insertion pawl engageable with the security slot and protruding through the opening and a first base portion accommodated in the housing;

a second insertion piece having a second insertion pawl engageable with the security slot and protruding through the opening and a second base portion accommodated in the housing;

a support portion provided in the housing to pivotally support the first insertion piece and the second insertion piece between the forward end portion and the base end portion of the housing such that an opening angle between the first insertion piece and the second insertion piece is variable;

an insertion piece biasing means for biasing the first insertion piece and the second insertion piece such that the opening angle between the first insertion piece and the second insertion piece becomes smaller;

an angle adjusting means adapted to enter between the first base portion of the first insertion piece and second base portion of the second insertion piece and to adjust the opening angle between the first insertion piece and the second insertion piece at least to a first opening angle and a second opening angle, by changing a depth the angle adjusting means is inserted between the first base portion and the second base portion; and a locking means for holding and locking the angle adjusting means in both a first state corresponding to the first opening angle and a second state corresponding to the second opening angle and the first insertion piece and the second insertion piece are adjusted to the first opening angle by the angle adjusting means in the first state and the first insertion piece and the second insertion piece are adjusted to the second opening angle by the angle adjusting means in the second state.

2. The anti-theft connector for equipment according to claim 1 wherein the angle adjusting means is forced toward the base end portion side of the housing and comprises an angle adjustment piece formed at its forward end side and adapted to enter between the first base portion and the second base portion, and when the angle adjusting piece enters between the first base portion and the second base portion, the angle adjusting means is movable between the first state where the first insertion piece and the second insertion piece are in the first opening angle, the second state where the first insertion piece and the second insertion piece are in the second opening angle, and a third state where the angle adjustment piece does not enter between the first base portion and the second base portion.

3. The anti-theft connector for equipment according to claim 2, wherein the anti-theft connector comprises an adjuster member to move the angle adjusting means between the first state and the third state and between the second state and the third state.

4. The anti-theft connector for equipment according to claim 3, wherein the adjuster member is adapted to push the angle adjusting means from the third position into the first position or to push the angle adjusting means from the third position into the second position, when locked by the locking means.

5. The anti-theft connector for equipment according to claim 4, wherein the angle adjusting means has a concave portion and a convex portion on its base end, and the adjuster member is adapted to push the angle adjusting means from the third position to the first position by contacting the convex portion and to push the angle adjusting means from the third position to the second position by contacting the concave portion.

6. The anti-theft connector for equipment according to claim 4, the angle adjusting means and the adjuster member are threaded to each other, and a length of the angle adjusting means and the adjuster member can be adjusted by rotating the adjuster member relative to the angle adjusting means.

7. The anti-theft connector for equipment according to claim 1, wherein the locking means comprises a locking pin disposed at the base end portion side of the housing and movable toward the base end portion side, and is locked by the movement of the locking pin toward the base end portion side of the housing, and when the locking pin is moved toward the base end portion side of the housing, a front tip of the locking pin pushes the angle adjusting means toward the base end portion side of the housing.

8. The anti-theft connector for equipment according to claim 1, wherein the anti-theft connector comprises a wire member connected to the housing.

* * * * *